United States Patent
Hashimoto et al.

(10) Patent No.: US 9,074,057 B2
(45) Date of Patent: Jul. 7, 2015

(54) PRINTING FILM AND FACE MATERIAL

(75) Inventors: Masanori Hashimoto, Tokyo (JP); Atsushi Watanabe, Tokyo (JP); Wataru Kakuno, Tokyo (JP)

(73) Assignee: TECHNO POLYMER CO., LTD., Tokyo (JP)

( * ) Notice: Subject to any disclaimer, the term of this patent is extended or adjusted under 35 U.S.C. 154(b) by 838 days.

(21) Appl. No.: 12/919,337

(22) PCT Filed: Feb. 27, 2009

(86) PCT No.: PCT/JP2009/000887
§ 371 (c)(1),
(2), (4) Date: Oct. 21, 2010

(87) PCT Pub. No.: WO2009/107394
PCT Pub. Date: Sep. 3, 2009

(65) Prior Publication Data
US 2011/0039080 A1 Feb. 17, 2011

(30) Foreign Application Priority Data

Feb. 28, 2008 (JP) ................................. 2008-048754
Mar. 21, 2008 (JP) ................................. 2008-073051
Jan. 26, 2009 (JP) ................................. 2009-014291

(51) Int. Cl.
*B32B 3/10* (2006.01)
*B32B 27/00* (2006.01)
(Continued)

(52) U.S. Cl.
CPC ............ *C08J 5/18* (2013.01); *Y10T 428/24802* (2015.01); *Y10T 428/24884* (2015.01);
(Continued)

(58) Field of Classification Search
CPC ................................. B32B 27/30; B32B 27/34
USPC ........................................................ 428/195.1
See application file for complete search history.

(56) References Cited

U.S. PATENT DOCUMENTS

2002/0150734 A1* 10/2002 Snow et al. ................... 428/195
2003/0224149 A1* 12/2003 Takada ........................ 428/195.1
(Continued)

FOREIGN PATENT DOCUMENTS

EP      1 770 125 A1    4/2007
JP      2002-47362      2/2002
(Continued)

OTHER PUBLICATIONS

International Search Report for PCT/JP2009/000887, mailed Jun. 9, 2009.
(Continued)

*Primary Examiner* — Mark Ruthkosky
*Assistant Examiner* — Ian Rummel
(74) *Attorney, Agent, or Firm* — Nixon & Vanderhye P.C.

(57) ABSTRACT

The present invention provides a resin film which is excellent in various properties such as heat resistance, printability, mechanical strength, moisture absorption resistance, film-forming property and flexibility and can be suitably used in the printing applications. There is provided a printing film obtained by molding a thermoplastic resin composition (I) comprising 100 parts by mass in total of a mixed resin comprising 25 to 75% by mass of a rubber-modified styrene-based resin (A) and 25 to 75% by mass of a polyamide-based resin (B). The component (A) comprises a graft copolymer obtained by polymerizing a vinyl-based monomer in the presence of a rubber polymer, or a mixture comprising the graft copolymer and a (co)polymer of the vinyl-based monomer. The vinyl-based monomer comprises an aromatic vinyl compound and a cyanided vinyl compound, and further comprises a functional group-containing vinyl-based monomer in an amount of 0.1 to 1.2% by mass based on the component (A) in which an acetone-soluble component in the component (A) has an intrinsic viscosity of 0.15 to 1.5 dL/g (as measured at 30° C. in methyl ethyl ketone). The composition (I) comprises the rubber polymer in an amount of 5 to 30 parts by mass based on 100 parts by mass of the composition.

19 Claims, 2 Drawing Sheets

(51) Int. Cl.
*C08L 77/00* (2006.01)
*C08L 51/00* (2006.01)
*C08K 3/34* (2006.01)
*B32B 37/00* (2006.01)
*C08J 5/18* (2006.01)
*B32B 27/06* (2006.01)
*B32B 27/30* (2006.01)
*B32B 27/34* (2006.01)
*C08L 51/04* (2006.01)
*C08L 55/02* (2006.01)
*C08L 77/02* (2006.01)

(52) U.S. Cl.
CPC ............... *B32B 27/06* (2013.01); *B32B 27/30* (2013.01); *B32B 27/34* (2013.01); *C08J 2351/04* (2013.01); *C08J 2377/00* (2013.01); *C08L 51/00* (2013.01); *C08L 51/04* (2013.01); *C08L 55/02* (2013.01); *C08L 77/00* (2013.01); *C08L 77/02* (2013.01); *C08L 2205/02* (2013.01); *C08L 2205/03* (2013.01); *C08L 2205/035* (2013.01)

(56) References Cited

U.S. PATENT DOCUMENTS

2004/0235999 A1 11/2004 Vathauer et al.
2008/0071024 A1 3/2008 Morishita et al.

FOREIGN PATENT DOCUMENTS

JP 2007-327011 12/2007
WO WO 2006009052 A1 * 1/2006

OTHER PUBLICATIONS

Supplementary European Search Report in EP 09 71 4451 dated Jul. 11, 2011.

* cited by examiner

PRINTING FILM AND FACE MATERIAL

This application is the U.S. national phase of International Application No. PCT/JP2009/000887 filed 27 Feb. 2009, which designated the U.S. and claims priority to JP Application No. 2008-048754 filed 28 Feb. 2008; JP Application No. 2008-073051 filed 21 Mar. 2008; and JP Application No. 2009-014291 filed 26 Jan. 2009, the entire contents of each of which are hereby incorporated by reference.

TECHNICAL FIELD

The present invention relates to a printing film and a face material using the printing film.

Meanwhile, in general, the term "film" means a material having a thickness of not more than 0.254 mm ($1/100$ inch). However, it should be noted that the term "film" as used in the present invention involves not only the above film but also a material having a still larger thickness, i.e., a so-called "sheet".

BACKGROUND ART

Hitherto, when laminating a printed layer on a surface of an ABS resin film, a transfer film comprising a PET film and the printed layer previously provided on a surface of the PET film is thermally laminated on the ABS resin film, and then the PET film is peeled off therefrom to transfer the printed layer on the ABS resin film (refer to Patent Document 1). The reason therefor is that the ABS resin film is not directly subjected to printing owing a poor solvent resistance thereof. However, in the above conventional printing method using the transfer film, since the transfer film must be subjected to the peeling step after transferring the printed layer, there tend to arise the problems such as complicated production process, increase in costs owing to disposal of the transfer film as waste, and risk of inclusion of foreign matters into the resulting laminate during the production process.

On the other hand, it will be considered that the surface of the ABS resin film is subjected to corona treatment to form an anchor coat layer thereon, and then the printed layer is formed on the anchor coat layer (refer to Patent Documents 2 and 3). However, in this printing method, since the additional step of forming the anchor coat layer is required, the production process tends to become complicated. Therefore, it has been demanded to provide a method of directly forming the printed layer on the ABS resin film.

Also, when thus forming the printed layer on the resin film and then thermally laminating a transparent resin layer such as an acrylic resin layer on the printed layer, the resin film is required to have sufficient heat resistance, mechanical strength and dimensional stability, etc. However, the conventional ABS resin film may fail to exhibit these properties to a sufficient extent.

In addition, upon formation of the above resin film, there tends to occur such a problem that the resin film is hardly released from a roll (for example, cast roll or cooling roll) and lifted therefrom while being kept adhered thereto, so that the resulting resin film tends to have a poor appearance. In particular, the above problem tends to become more remarkable in the case where the film-forming temperature (roll temperature) is raised to obtain a film having an excellent heat resistance.

Patent Document 1: Japanese Patent Application Laid-Open (KOKAI) No. 2005-178276
Patent Document 2: Japanese Patent Application Laid-Open (KOKAI) No. 2007-210309
Patent Document 3: Japanese Patent Application Laid-Open (KOKAI) No. 2007-211219

DISCLOSURE OF THE INVENTION

Problems to be Solved by the Invention

An object of the present invention is to provide a rubber-modified styrene-based resin film which has an excellent solvent resistance and can be directly subjected to printing, and further which is excellent in properties such as heat resistance, printability, mechanical strength, resistance to moisture absorption, film-forming property and flexibility and can be suitably used in the printing applications.

Another object of the present invention is to provide a printing film which exhibits, in addition to the above properties, a less adhesion to rolls upon formation thereof and an excellent appearance.

A further object of the present invention is to provide a face material using the above printing film.

Means for Solving the Problems

As a result of the present inventors' earnest study for solving the above problems, it has been found that when blending a specific rubber-modified styrene-based resin with a predetermined amount of a polyimide-based resin, it is possible to produce a printing film which is excellent in solvent resistance, heat resistance, printability, mechanical strength, resistance to moisture absorption, film-forming property, flexibility, etc., and can be directly subjected to printing. The present invention has been attained on the basis of this finding.

That is, according to the present invention, there can be provided the following inventions.

[1] A printing film produced by molding a thermoplastic resin composition (I) comprising 25 to 75% by mass of a rubber-modified styrene-based resin (A) and 25 to 75% by mass of a polyamide-based resin (B), the component (A) comprising a graft copolymer (A1) obtained by polymerizing a vinyl-based monomer (b1) in the presence of a rubber polymer (a), or a mixture of the graft copolymer (A1) and a (co)polymer (A2) of a vinyl-based monomer (b2);

the vinyl-based monomer (b1) and the vinyl-based monomer (b2) each comprising an aromatic vinyl compound and a cyanided vinyl compound as essential monomer components;

at least one of the vinyl-based monomer (b1) and the vinyl-based monomer (b2) further comprising at least one functional group-containing vinyl-based monomer selected from the group consisting of a hydroxyl group-containing unsaturated compound, an epoxy group-containing unsaturated compound, a substituted or unsubstituted amino group-containing unsaturated compound, a carboxyl group-containing unsaturated compound, an acid anhydride group-containing unsaturated compound and an oxazoline group-containing unsaturated compound;

a content of the functional group-containing vinyl-based monomer in the component (A) being 0.1 to 1.2% by mass based on 100% by mass of a whole amount of the component (A);

the component (A) comprising an acetone-soluble component having an intrinsic viscosity of 0.15 to 1.5 dL/g as measured in methyl ethyl ketone at 30° C.; and the thermoplastic resin composition (I) comprising the rubber polymer (a) in an amount of 5 to 30 parts by mass based on 100 parts by mass of a total amount of the components (A) and (B).

In the especially preferred embodiment of the present invention, the thermoplastic resin composition (I) further comprises an inorganic filler (C) in an amount of 7 to 18 parts by mass based on 100 parts by mass of a total amount of the components (A) and (B).

In another aspect of the present invention, there is provided a decorative film comprising the above printing film and a printed layer laminated on at least one surface of the printing film. The decorative film may further comprise a transparent resin layer laminated on the printed layer.

In a further aspect of the present invention, there is provided a process for producing a decorative film comprising the step of directly laminating the printed layer on at least one surface of the printing film without subjecting the film to anchor coat-forming treatment.

Also, according to the present invention, the following invention is provided.

[II] A face material comprising a base material, the printing film laminated on at least one surface of the base material, and a patterned layer laminated on at least a part of a surface of the printing film which surface is opposite to its surface where the base material is provided.

Effect of the Invention

In accordance with the present invention, when blending a specific rubber-modified styrene-based resin with a predetermined amount of a polyamide-based resin, it is possible to provide a printing film which is excellent in solvent resistance, heat resistance, printability, mechanical strength, moisture absorption resistance, film-forming property, flexibility, etc., and the printing film can be directly printed thereon without subjecting the film to anchor coat-forming treatment. In addition, when blending a predetermined amount of an inorganic filler in the film, the resulting film can be prevented from adhering to a roll upon formation of the film, thereby obtaining a printing film having an excellent appearance.

EXPLANATION OF REFERENCE NUMERALS

Figure 1:
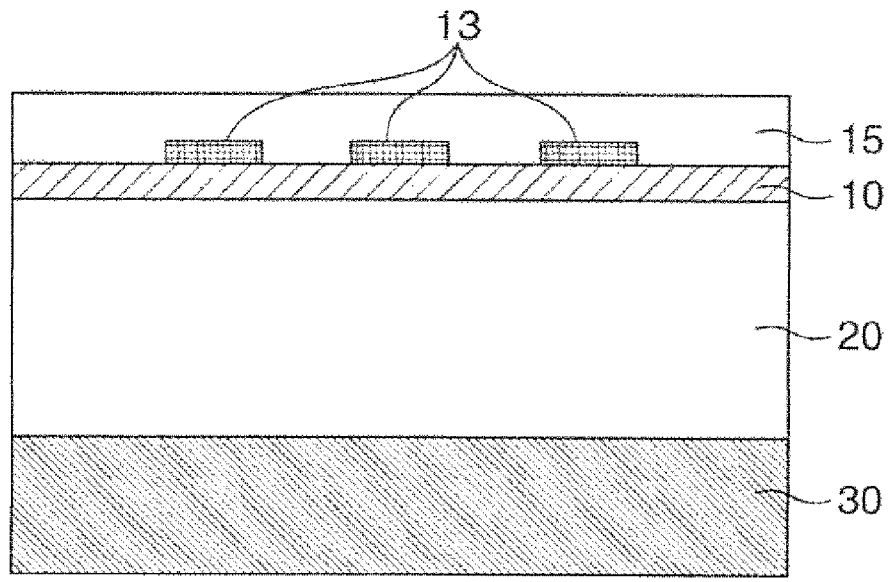
FIG. 1 is a schematic sectional view showing an example of a face material according to the present invention.

10: Printing film; 13: Patterned layer (printed layer); 15: Transparent resin layer; 20: Base material layer; 20a: First base material layer; 20b: Second base material layer; 30: Protective film

PREFERRED EMBODIMENTS FOR CARRYING OUT THE INVENTION

The present invention is described in detail below. Meanwhile, the "(co)polymerization" as used herein means both of homopolymerization and copolymerization, the "(meth)acrylic" as used herein means acrylic and/or methacrylic, and the "(meth)acrylate" as used herein means an acrylate and/or a methacrylate.

First, the printing film of the present invention is described.
The printing film of the present invention is produced by molding a thermoplastic resin composition (I) comprising 25 to 75% by mass of a rubber-modified styrene-based resin (A) and 25 to 75% by mass of a polyamide-based resin (B). In the especially preferred embodiment of the present invention, the thermoplastic resin composition (I) further comprises an inorganic filler (C) in an amount of 7 to 18 parts by mass based on 100 parts by mass of a total amount of the components (A) and (B).

In the followings, the respective components are explained in detail.

1. Component (A) (Rubber-modified Styrene-based Resin):

The component (A) used in the present invention is a rubber-modified styrene-based resin which comprises a graft copolymer (A1) obtained by polymerizing a vinyl-based monomer (b1) in the presence of a rubber polymer (a), or a mixture of the graft copolymer (A1) and a (co)polymer (A2) of a vinyl-based monomer (b2). The (co)polymer (A2) is produced by polymerizing the vinyl-based monomer (b2) in the absence of the rubber polymer (a).

1-1. Rubber Polymer (a)

The rubber polymer (a) is not particularly limited. Examples of the rubber polymer (a) include conjugated diene-based rubber polymers and non-conjugated diene-based rubber polymers. Specific examples of the conjugated diene-based rubber polymers include polybutadiene, butadiene-styrene copolymers, butadiene-acrylonitrile copolymers and hydrogenated products of these compounds. Specific examples of the non-conjugated diene-based rubber polymers include ethylene-α-olefin-based copolymer rubbers such as ethylene-propylene copolymers, ethylene-propylene-non-conjugated diene copolymers, ethylene-1-butene copolymers, ethylene-1-butene-non-conjugated diene copolymers, ethylene-1-octene copolymers and ethylene-1-octene-non-conjugated diene copolymers; acrylic rubbers; silicone-based rubbers; and silicone-acrylic IPN rubbers. These rubber polymers may be used alone or in combination of any two or more thereof. Among these rubber polymers (a), preferred are conjugated diene-based rubber polymers.

The gel content in the rubber polymer (a) is usually 20 to 99% by mass, preferably 30 to 98% by mass and more preferably 40 to 98% by mass. When the gel content in the rubber polymer (a) lies within the above-specified range, the rubber polymer (a) is excellent in balance between film-processing property and impact resistance.

Meanwhile, the gel content may be determined by the following method. First, 1 g of the rubber polymer (a) is charged into 20 mL of acetone (acetonitrile in the case of an acrylic rubber), and then stirred at 1,000 rpm under a temperature condition of 25° C. for 2 hr using a stirrer. Thereafter, the resulting mixture is subjected to centrifugal separation for 1 hr using a centrifugal separator (rotating speed: 22,000 rpm) to separate an insoluble component from a soluble component. The thus separated insoluble component is weighed (mass: W1 (g)), and the gel content in the rubber polymer (a) is calculated from the following formula.

$$\text{Gel content (\% by mass)}=[W1(g)/1(g)]\times 100$$

Meanwhile, the gel content may be controlled by appropriately adjusting kinds and amounts of monomers used, kind and amount of molecular weight controller, polymerization time, polymerization temperature, polymerization conversion rate, etc., upon production of the rubber polymer (a).

1-2. Vinyl-based Monomer (b1):

The vinyl-based monomer (b1) comprises an aromatic vinyl compound and a cyanided vinyl compound as essential components, and further may optionally comprise at least one functional group-containing vinyl-based monomer selected from the group consisting of a hydroxyl group-containing unsaturated compound, an epoxy group-containing unsaturated compound, a substituted or unsubstituted amino group-containing unsaturated compound, a carboxyl group-containing unsaturated compound, an acid anhydride group-containing unsaturated compound and an oxazoline group-containing unsaturated compound according to the requirements. When the functional group-containing vinyl-based monomer is used in the vinyl-based monomer (b1), the components (A) and (B) used in the present invention can be improved in compatibility therebetween.

However, in the present invention, it is required that at least one of the vinyl-based monomer (b1) and the vinyl-based monomer (b2) comprises the above functional group-containing vinyl-based monomer. Therefore, when the vinyl-based monomer (b2) does not comprise the above functional group-containing vinyl-based monomer, it is required that the vinyl-based monomer (b1) comprises the above functional group-containing vinyl-based monomer. Meanwhile, in the present specification, the vinyl-based monomer (b1) which does not comprise the above functional group-containing vinyl-based monomer may be occasionally referred to as a vinyl-based monomer (b1-1), whereas the vinyl-based monomer (b1) which comprises the above functional group-containing vinyl-based monomer may be occasionally referred to as a vinyl-based monomer (b1-2).

Examples of the aromatic vinyl compound include styrene, α-methyl styrene, o-methyl styrene, p-methyl styrene, vinyl toluene, vinyl xylene, ethyl styrene, dimethyl styrene, p-tert-butyl styrene, vinyl naphthalene, methoxystyrene, monobromostyrene, dibromostyrene, tribromostyrene and fluorostyrene. Among these aromatic vinyl compounds, preferred are styrene and α-methyl styrene. In addition, these aromatic compounds may be used alone or in combination of any two or more thereof.

Examples of the above cyanided vinyl compound include acrylonitrile, methacrylonitrile and α-chloro(meth)acrylonitrile. Among these cyanided vinyl compounds, preferred is acrylonitrile. These cyanided vinyl compounds may be used alone or in combination of any two or more thereof.

Examples of the hydroxyl group-containing unsaturated compound include 3-hydroxy-1-propane, 4-hydroxy-1-butene, cis-4-hydroxy-2-butene, trans-4-hydroxy-2-butene, 3-hydroxy-2-methyl-1-propene, 2-hydroxyethyl acrylate, 2-hydroxyethyl methacrylate and hydroxystyrene. These hydroxyl group-containing unsaturated compounds may be used alone or in combination of any two or more thereof.

Examples of the epoxy group-containing unsaturated compound include glycidyl acrylate, glycidyl methacrylate and allyl glycidyl ether. These epoxy group-containing unsaturated compounds may be used alone or in combination of any two or more thereof.

Examples of the substituted or unsubstituted amino group-containing unsaturated compound include aminoethyl acrylate, aminoethyl methacrylate, aminopropyl methacrylate, propylaminoethyl acrylate, dimethylaminoethyl methacrylate, phenylaminoethyl methacrylate, N-vinyldiethyl amine, N-acetylvinyl amine, acrylamine, methacrylamine, N-methyl acrylamine, acrylamide, N-methyl acrylamide and p-aminostyrene. These substituted or unsubstituted amino group-containing unsaturated compounds may be used alone or in combination of any two or more thereof.

Examples of the carboxyl group-containing unsaturated compound include acrylic acid, methacrylic acid, ethacrylic acid, maleic acid, fumaric acid, itaconic acid, crotonic acid and cinnamic acid. These carboxyl group-containing unsaturated compounds may be used alone or in combination of any two or more thereof.

Examples of the acid anhydride group-containing unsaturated compound include unsaturated carboxylic acid anhydrides such as maleic anhydride, itaconic anhydride and citraconic anhydride. These acid anhydride group-containing unsaturated compounds may be used alone or in combination of any two or more thereof.

Examples of the oxazoline group-containing unsaturated compound include vinyl oxazoline and the like. These oxazoline group-containing unsaturated compounds may be used alone or in combination of any two or more thereof.

Further, the vinyl-based monomer (b1) may also comprise, in addition to the above compounds, the other copolymerizable monomers such as (meth)acrylic acid esters and maleimide compounds.

Examples of the (meth)acrylic acid esters include methyl (meth)acrylate, ethyl(meth)acrylate, n-propyl(meth)acrylate, isopropyl(meth)acrylate, n-butyl(meth)acrylate and isobutyl (meth)acrylate. These (meth)acrylic acid esters may be used alone or in combination of any two or more thereof. Among these methacrylic acid esters, preferred is methyl methacrylate. When using the (meth)acrylic acid ester as the other copolymerizable monomer, the resulting component (A) can be improved in transparency.

Examples of the maleimide compound include maleimide, N-methyl maleimide, N-butyl maleimide, N-phenyl maleimide and N-cyclohexyl maleimide. These maleimide compounds may be used alone or in combination of any two or more thereof. In addition, in order to introduce an maleimide-based monomer unit into the copolymer resin, maleic anhydride may be (co)polymerized therewith, and then the resultant (co)polymer may be subjected to imidization. When using the maleimide compound as the other copolymerizable monomer, the resulting component (A) may be improved in heat resistance.

The kind and amount of the above vinyl-based monomer (b1) used may be selected and determined according to the objects and applications. The total amount of the aromatic vinyl compound and the cyanided vinyl compound is usually 50 to 100% by mass, preferably 70 to 100% by mass and more preferably 80 to 100% by mass based on 100% by mass of a whole amount of the vinyl-based monomer (b1). The content of the functional group-containing vinyl-based monomer in the vinyl-based monomer (b1) is usually 0 to 50% by mass, preferably 0 to 30% by mass and more preferably 0 to 20% by mass based on 100% by mass of a whole amount of the vinyl-based monomer (b1). The ratio between the amounts of the aromatic vinyl compound and the cyanided vinyl compound used (aromatic vinyl compound/cyanided vinyl compound) is usually 40 to 95% by mass/5 to 60% by mass, preferably 50 to 90% by mass/10 to 50% by mass, and more preferably 55 to 85% by mass/15 to 45% by mass based on 100% by mass of a total amount of the aromatic vinyl compound and the cyanided vinyl compound.

1-3. Vinyl-based Monomer (b2):

The vinyl-based monomer (b2) comprises an aromatic vinyl compound and a cyanided vinyl compound as essential components, and further may optionally comprise at least one functional group-containing vinyl-based monomer selected from the group consisting of a hydroxyl group-containing unsaturated compound, an epoxy group-containing unsaturated compound, a substituted or unsubstituted amino group-containing unsaturated compound, a carboxyl group-containing unsaturated compound, an acid anhydride group-containing unsaturated compound and an oxazoline group-containing unsaturated compound according to the requirements.

However, in the present invention, it is required that at least one of the vinyl-based monomer (b1) and the vinyl-based monomer (b2) comprises the above functional group-containing vinyl-based monomer. Therefore, when the vinyl-based monomer (b1) does not comprise the above functional group-containing vinyl-based monomer, it is required that the vinyl-based monomer (b2) comprises the above functional group-containing vinyl-based monomer. Meanwhile, in the present specification, the vinyl-based monomer (b2) which does not comprise the above functional group-containing vinyl-based monomer may be occasionally referred to as a vinyl-based monomer (b2-1), whereas the vinyl-based monomer (b2) which comprises the above functional group-containing vinyl-based monomer may be occasionally referred to as a vinyl-based monomer (b2-2).

The aromatic vinyl compound, the cyanided vinyl compound, the functional group-containing vinyl-based monomer and the other copolymerizable monomers usable as the above vinyl-based monomer (b2) all are the same as those described for the above vinyl-based monomer (b1).

The kind and amount of the above vinyl-based monomer (b2) used may be selected and determined according to the objects and applications. The total amount of the aromatic vinyl compound and the cyanided vinyl compound is usually 50 to 100% by mass, preferably 70 to 100% by mass and more preferably 80 to 100% by mass based on 100% by mass of a whole amount of the vinyl-based monomer (b2). The content of the functional group-containing vinyl-based monomer in the vinyl-based monomer (b2) is usually 0 to 50% by mass, preferably 0 to 30% by mass and more preferably 0 to 20% by mass based on 100% by mass of a whole amount of the vinyl-based monomer (b2). The ratio between the amounts of the aromatic vinyl compound and the cyanided vinyl compound used (aromatic vinyl compound/cyanided vinyl compound) is usually 40 to 95% by mass/5 to 60% by mass, preferably 50 to 90% by mass/10 to 50% by mass, and more preferably 55 to 85% by mass/15 to 45% by mass based on 100% by mass of a total amount of the aromatic vinyl compound and the cyanided vinyl compound.

1-4. Process for Producing the Rubber-modified Styrene-based Resin (A):

The component (A) used in the present invention essentially consists of a graft copolymer (A1), or a mixture of the graft copolymer (A1) and a (co)polymer (A2) of the vinyl-based monomer (b2).

The above graft copolymer (A1) may comprise the following component (A1-1) and/or the following component (A1-2).

Component (A1-1): A graft copolymer obtained by polymerizing the vinyl-based monomer (b1-1) comprising the aromatic vinyl compound and the cyanided vinyl compound as essential components (which does not, however, comprise the functional group-containing vinyl-based monomer) in the presence of the rubber polymer (a); and Component (A1-2): A graft copolymer obtained by polymerizing the vinyl-based monomer (b1-2) comprising the aromatic vinyl compound and the cyanided vinyl compound, and at least one functional group-containing vinyl-based monomer selected from the group consisting of a hydroxyl group-containing unsaturated compound, an epoxy group-containing unsaturated compound, a substituted or unsubstituted amino group-containing unsaturated compound, a carboxyl group-containing unsaturated compound, an acid anhydride group-containing unsaturated compound and an oxazoline group-containing unsaturated compound as essential components in the presence of the rubber polymer (a).

The above (co)polymer (A2) may comprise the following component (A2-1) and/or the following component (A2-2).

Component (A2-1): A (co)polymer obtained by polymerizing the vinyl-based monomer (b2-1) comprising the aromatic vinyl compound and the cyanided vinyl compound as essential components (which does not, however, comprise the functional group-containing vinyl-based monomer) in the absence of the rubber polymer (a); and Component (A2-2): A (co)polymer obtained by polymerizing the vinyl-based monomer (b2-2) comprising the aromatic vinyl compound and the cyanided vinyl compound, and at least one functional group-containing vinyl-based monomer selected from the group consisting of a hydroxyl group-containing unsaturated compound, an epoxy group-containing unsaturated compound, a substituted or unsubstituted amino group-containing unsaturated compound, a carboxyl group-containing unsaturated compound, an acid anhydride group-containing unsaturated compound and an oxazoline group-containing unsaturated compound as essential components in the absence of the rubber polymer (a).

In the component (A) used in the present invention, it is required that at least one of the vinyl-based monomer (b1) and the vinyl-based monomer (b2) comprises the functional group-containing vinyl-based monomer. Therefore, it is required that the component (A) comprises at least one of the above component (A1-2) and the above component (A2-2) as an essential component.

Thus, when the above component (A1) is the above component (A1-2) or a mixture of the above component (A1-1) and the above component (A1-2), it is not required that the component (A) comprises the above component (A2). In this case, when the above component (A) comprises the above component (A2), the component (A2) may be the above component (A2-1) and/or the above component (A2-2).

Also, when the above component (A1) is the above component (A1-1), it is required that the component (A) comprises the above component (A2), and the component (A2) is the above component (A2-2) or a mixture of the above component (A2-1) and the above component (A2-2).

The above graft copolymer (A1) usually comprises a graft copolymer obtained by grafting a (co)polymer of the vinyl-based monomer (b1) to the rubber polymer (a), and the (co)polymer of the vinyl-based monomer (b1) which is not grafted to the rubber polymer (a). However, the graft copolymer (A1) may also comprise the rubber polymer (a) to which the (co)polymer of the vinyl-based monomer (b1) is not grafted.

The content of the above functional group-containing vinyl-based monomer in the component (A) is 0.1 to 1.2% by mass, preferably 0.1 to 1.1% by mass, more preferably 0.2 to 1.0% by mass and especially preferably 0.2 to 0.9% by mass based on 100% by mass of a whole amount of the above component (A). When the content of the functional group-containing vinyl-based monomer in the component (A) lies within the above specified range, the printed film of the present invention can be imparted with sufficient mechanical strength and dimensional stability. The functional group-containing vinyl-based monomer may be derived from either the above component (A1) or the above component (A2) as long as the above specified content thereof is satisfied.

The process for producing the above graft copolymer (A1) is not particularly limited. The above graft copolymer (A1) may be produced by known polymerization methods such as, for example, emulsion polymerization, solution polymerization, bulk polymerization and suspension polymerization. Among these polymerization methods, preferred is the emulsion polymerization method. Meanwhile, the ratio between the amounts of the rubber polymer (a) and the vinyl-based monomer (b1) used (rubber polymer (a)/vinyl-based monomer (b1)) is usually 5 to 80% by mass/20 to 95% by mass, preferably 5 to 70% by mass/30 to 95% by mass, and more preferably 10 to 65% by mass/35 to 90% by mass based on 100% by mass of a total amount of the rubber polymer (a) and the vinyl-based monomer (b1).

In the case where the above graft copolymer (A1) is produced by emulsion polymerization, there may be used a polymerization initiator, an emulsifier, a chain transfer agent (molecular weight controller), an electrolyte, water, etc. Meanwhile, the emulsifier and the chain transfer agent may not be used depending upon the conditions, but are usually used.

Examples of the polymerization initiator include cumene hydroperoxide, diisopropyl benzene hydroperoxide, benzoyl peroxide, lauroyl peroxide, potassium persulfate, azobisisobutyronitrile, tert-butyl peroxylaurate and tert-butyl peroxymonocarbonate. These polymerization initiators may be used alone or in combination of any two or more thereof.

The above polymerization initiator may be added to the reaction system at one time or continuously. The amount of the polymerization initiator used is usually 0.1 to 5 parts by mass and preferably 0.5 to 2 parts by mass based on 100 parts by mass of a whole amount of the above vinyl-based monomer.

Examples of the emulsifier include include alkylsulfonic acid salts such as alkanesulfonic acid salts, alkylbenzenesulfonic acid salts and alkylnaphthalenesulfonic acid salts; rosinates such as alkali metal salts (sodium salts or potassium salts) of rosin acid (usually comprising abietic acid as a main component) such as gum rosin, wood rosin, tall oil rosin, disproportionated rosins obtained by subjecting these rosins to disproportionation reaction, and purified rosins; anionic surfactants such as sulfuric acid esters of higher alcohols, higher aliphatic carboxylic acid salts and phosphoric acid salts; and nonionic surfactants.

The amount of the emulsifier used is usually 0.1 to 5 parts by mass and preferably 0.1 to 3 parts by mass based on 100 parts by mass of a whole amount of the above vinyl-based monomer (b1).

Examples of the chain transfer agent include mercaptans such as n-hexyl mercaptan, n-octyl mercaptan, n-dodecyl mercaptan and tert-dodecyl mercaptan, tetraethyl thiuram sulfide, acrolein, methacrolein, allyl alcohol, 2-ethylhexyl thioglycol and terpinolenes. These chain transfer agents may be used alone or in combination of any two or more thereof. The amount of the chain transfer agent used is usually 0.01 to 5 parts by mass and preferably 0.05 to 3 parts by mass based on 100 parts by mass of a whole amount of the above vinyl-based monomer (b1).

When the above graft copolymer (A1) is produced by emulsion polymerization, the polymerization temperature is usually 30 to 95° C. and preferably 40 to 90° C. When the graft copolymer (A1) is recovered from a latex obtained by the emulsion polymerization, a coagulant, e.g., inorganic salts such as calcium chloride, magnesium sulfate and magnesium chloride; and acids such as sulfuric acid, hydrochloric acid, acetic acid, citric acid and malic acid, is usually added to the reaction system. Thereafter, the thus coagulated graft copolymer (A1) is washed with water and then dried to obtain a powder thereof.

Also, the graft copolymer (A1) may be produced, for example, by solution polymerization, bulk polymerization, suspension polymerization, etc. In the case of the solution polymerization, the rubber polymer and the vinyl-based monomer may be usually dissolved in an inert polymerization solvent including aromatic hydrocarbons such as toluene and ethyl benzene; ketones such as methyl ethyl ketone; acetonitrile; dimethyl formamide; and N-methylpyrrolidone, and then polymerized in the presence of a polymerization initiator or subjected to thermal polymerization in the absence of the polymerization initiator.

The above (co)polymer (A2) may be produced by the same method as used for production of the graft copolymer (A1) except for using no rubber polymer (a). Specific examples of the polymerization method used for production of the (co)polymer (A2) include bulk polymerization, solution polymerization, emulsion polymerization and suspension polymerization.

1-5. Properties of Rubber-modified Styrene-based Resin:

The grafting ratio of the graft copolymer (A1) is usually 20 to 170%, preferably 20 to 150% and more preferably 30 to 150%. When the grafting ratio is less than 20%, the resulting molded film tends to suffer from flow marks and tends to be sometimes insufficient in mechanical strength. When the grafting ratio is more than 170%, the graft copolymer (A1) tends to have an excessively high viscosity, so that it may be difficult to obtain a film having a reduced thickness.

Meanwhile, the grafting ratio of the above graft copolymer (A1) may be suitably controlled by appropriately selecting the kind and amount of the chain transfer agent used upon the production, the kind and amount of the polymerization initiator used upon the production, the method of adding the monomer components and addition time used upon the polymerization, etc.

Meanwhile, the above grafting ratio may be calculated from the following formula.

$$\text{Grafting ratio (\% by mass)} = \{(S-T)/T\} \times 100$$

In the above formula, S is a mass (g) of an insoluble component obtained by the method in which 1 g of the graft copolymer is charged into 20 mL of acetone (acetonitrile in the case where an acrylic rubber is used as the rubber polymer), and the resulting mixture is shaken at 25° C. for 2 hr using a shaker and then subjected to centrifugal separation at 5° C. for 60 min using a centrifugal separator (rotating speed: 23,000 rpm) to separate the insoluble component from a soluble component; and T is a mass (g) of the rubber polymer contained per 1 g of the graft copolymer. The mass of the rubber polymer may be determined by a method of calculating the mass from the polymerization formulation and polymerization conversion rate, a method of determining the mass by infrared absorption spectrum (IR), etc.

The intrinsic viscosity [η] of an acetone-soluble component (an acetonitrile-soluble component in the case where an acrylic rubber is used as the rubber polymer) of the above graft copolymer (A1) (as measured at 30° C. using methyl ethyl ketone as a solvent) is usually 0.15 to 1.5 dL/g, preferably 0.2 to 1.2 dL/g and more preferably 0.2 to 0.8 dL/g. When the intrinsic viscosity [η] is less than 0.15, the resulting film tends to be insufficient in heat resistance and mechanical strength. When the intrinsic viscosity [η] is more than 1.5, the resulting resin composition tends to be insufficient in film-forming property.

In addition, the intrinsic viscosity [η] of the above (co)polymer (A2) (as measured at 30° C. using methyl ethyl ketone as a solvent) is usually 0.15 to 1.5 dL/g, preferably 0.2 to 1.2 dL/g and more preferably 0.2 to 0.9 dL/g. When the intrinsic viscosity [η] is less than 0.15, the resulting film tends to be insufficient in heat resistance and mechanical strength. When the intrinsic viscosity [η] is more than 1.5, the resulting resin composition tends to be insufficient in film-forming property.

Meanwhile, the above intrinsic viscosity [η] is measured by the following method. First, the soluble component of the above graft copolymer (A1) or the above (co)polymer (A2) is dissolved in methyl ethyl ketone to prepare 5 samples which are different in concentration from each other. Using an Ubbellohde viscometer, a reduced viscosity at the respective concentrations of the samples is measured at 30° C. to determine an intrinsic viscosity [η] thereof (unit: dL/g).

The above intrinsic viscosity may be suitably controlled by appropriately selecting the kind and amount of the chain transfer agent used upon the production, the kind and amount of the polymerization initiator used upon the production, the polymerization temperature, etc.

The content of the rubber polymer (a) in the rubber-modified styrene-based resin used in the present invention is preferably 5 to 80% by mass, more preferably 5 to 70% by mass and still more preferably 10 to 65% by mass based on 100% by mass of a whole amount of the rubber-modified styrene-based resin.

2. Component (B) (Polyamide-based Resin):

Examples of the component (B) used in the present invention include polyamides obtained by polycondensing a three or more-membered ring lactam, a polymerizable ω-amino acid or a dibasic acid with diamine, etc. Specific examples of the component (B) include polymers of ε-caprolactam, aminocaproic acid, enanthlactam, 7-aminoheptanoic acid, 11-aminoundecanoic acid, 9-aminononanoic acid, α-pyrrolidone and α-piperidone; and polymers obtained by polycondensing a diamine such as hexamethylenediamine, nonamethylenediamine, undecamethylenediamine, dodecamethylenediamine and m-xylylenediamine with a dicarboxylic acid such as terephthalic acid, isophthalic acid, adipic acid, sebacic acid, dodecanedibasic acid and glutaric acid, and copolymers thereof, for example, such as nylons 4, 6, 7, 8, 11, 12, 6.6, 6.9, 6.10, 6.11, 6.12, 6T, 6/6.6, 6/12, 6/6T, 6T/6I and MXD6. These compounds may be used alone or in the form of a mixture of any two or more thereof.

The terminal end of the polyamide-based resin used in the present invention may be capped with a carboxylic acid or an amine. Among these polyamide-based resins, especially preferred are those polyimide-based resins whose terminal end is capped with a carboxylic acid or an amine having 6 to 22 carbon atoms. Examples of the carboxylic acid used for the end-capping include aliphatic monocarboxylic acids such as caproic acid, caprylic acid, capric acid, lauric acid, myristic acid, palmitic acid, stearic acid and behenic acid. Examples of the amine used for the end-capping include aliphatic primary amines such as hexyl amine, octyl amine, decyl amine, lauryl amine, myristyl amine, palmityl amine, stearyl amine and behenyl amine. The amount of the carboxylic acid or the amine used for the end-capping is preferably about 30 μeq/g.

In addition, it is required that the polyamide-based resin used in the present invention has a polymerization degree, i.e., a relative viscosity, which lies within a certain suitable range. The relative viscosity of the polyamide-based resin as measured at 25° C. with a concentration of 1% in 98% sulfuric acid according to JIS-K6810 is usually 2.0 to 4.0. When the relative viscosity is less than 2.0, the polyamide-based resin tends to be deteriorated in mechanical strength. When the relative viscosity is more than 4.0, the polyamide-based resin tends to be deteriorated in film-forming property. As the polyamide preferably used in the present invention, there may be mentioned nylon 6, nylon copolymer 6/66 and nylon 66 from the viewpoints of heat resistance, mechanical strength and film-forming property.

3. Component (C) (Inorganic Filler):

The inorganic filler as the component (C) used in the present invention may be selected from known inorganic fillers. The shape of the inorganic filler is not particularly limited, and may be any of a fiber shape, a plate shape, an acicular shape, a spherical shape and a powder shape. Examples of the inorganic fillers include glass fibers, carbon fibers, talc, mica, glass flakes, wollastonite, potassium titanate, magnesium sulfate, sepiolite, zonolite, aluminum borate, glass beads, balloons, calcium carbonate, silica, kaolin, clay, carbon black, titanium oxide, barium sulfate, zinc oxide and magnesium hydroxide. These inorganic fillers may be used alone or in the form of a mixture of any two or more thereof. Among these inorganic fillers, from the viewpoints of a good balance between strength and appearance of the resulting printing film and a good availability, preferred are glass fibers, mica, calc and wollastonite.

In the present invention, talc is preferably used as the inorganic filler (C). Talc is one kind of clay minerals in the form of hydrated magnesium silicates, and has a composition represented by the formula: $(MgO)_x(SiO_2)_y \cdot zH_2O$ (wherein x, y and z are each a positive value). A typical composition of talc is $[(MgO)_3(SiO_2)_4 H_2O]$. Also, a part of Mg in talc may be replaced with a divalent metal ion such as $Ca^{2+}$. The particle diameter of talc is not particularly limited, and an average particle size thereof as measured by a laser scattering method is usually 0.5 to 50 μm, preferably 1.0 to 25 μm and more preferably 1.5 to 20 μm. When the average particle size of talc is less than 0.5 μm, the dispersibility of talc tends to be insufficient, so that the resulting film tends to be unsatisfactory in appearance. On the other hand, when the average particle size of talc is more than 50 μm, the resulting film also tends to be unsatisfactory in appearance.

3. Thermoplastic Resin Composition (I):

The thermoplastic resin composition (I) of the present invention is obtained by mixing the above component (A), and component (B) and component (C) at a predetermined mixing ratio and then melt-kneading the resulting mixture. Meanwhile, the above component (C) is an optional component which may be used in the preferred embodiments of the present invention.

The above component (A) is effective to impart a good moisture absorption resistance to the printing film of the present invention. The amount of the component (A) compounded in the printing film is 25 to 75% by mass, preferably 30 to 70% by mass and more preferably 30 to 65% by mass based on 100% by mass of a total amount of the components (A) and (B). When the amount of the component (A) compounded is less than 25% by mass, the resulting film tends to be deteriorated in moisture absorption resistance. When the amount of the component (A) compounded is more than 75% by mass, the resulting film tends to be deteriorated in solvent resistance and heat resistance.

The above component (B) is effective to impart a good solvent resistance and a good heat resistance to the printing film of the present invention. The amount of the component (B) compounded in the printing film is 25 to 75% by mass, preferably 30 to 70% by mass and more preferably 35 to 70% by mass based on 100% by mass of a total amount of the components (A) and (B). When the amount of the component (B) compounded is less than 25% by mass, the resulting film tends to be deteriorated in solvent resistance and heat resistance. When the amount of the component (B) compounded is more than 75% by mass, the resulting film tends to be deteriorated in moisture absorption resistance.

The content of the rubber polymer (a) in the thermoplastic resin composition (I) of the present invention is 5 to 30 parts by mass, preferably 10 to 30 parts by mass and more preferably 10 to 22 parts by mass based on 100 parts by mass of a total amount of the components (A) and (B). When the content of the rubber polymer (a) lies within the above specified range, the resulting printing film can exhibit sufficient mechanical strength and film-forming property.

The above component (C) is effective to prevent the film from adhering to a roll upon formation thereof and impart an excellent film appearance to the printing film of the present invention. The amount of the component (C) compounded is usually 7 to 18 parts by mass, preferably 7 to 15 parts by mass and more preferably 8 to 12 parts by mass based on 100 parts by mass of a total amount of the components (A) and (B). When the amount of the component (C) compounded is less than 7 parts by mass, the initially aimed objects tend to be hardly achieved. When the amount of the component (C) compounded is more than 15 parts by mass, the resulting film tends to be deteriorated in solvent resistance (crack resistance). In the present invention, when adding the component (C), the resulting film can be prevented from adhering to a roll upon formation thereof, so that it is possible to increase the film-forming temperature (roll temperature). As a result, the resulting film can exhibit a more excellent heat resistance (higher elongation ratio under heating).

Meanwhile, the thermoplastic resin composition (I) of the present invention may also comprise, if required, various additives such as a nucleating agent, a heat stabilizer, an antioxidant, a ultraviolet absorber, a flame retardant, an anti-aging agent, a plasticizer, an anti-fungus agent and a colorant unless the addition thereof adversely affects the objects of the present invention.

The thermoplastic resin composition (I) of the present invention can be produced by mixing the respective components at a predetermined mixing ratio using a tumbler mixer or a Henschel mixer, and then melt-kneading the resulting mixture under appropriate conditions using a mixer such as a single-screw extruder, a twin-screw extruder, a Banbury mixer, a kneader, a roll and a feeder/ruder. Among these mixers, preferred is a twin-screw extruder. Further, the respective components may be kneaded at one time, or divided parts thereof may be intermittently mixed and kneaded in multi-stages. Meanwhile, after kneading the respective components using a Banbury mixer, a kneader, etc., the resulting mixture may be pelletized using an extruder. Also, among the inorganic fillers, a fibrous filler is preferably fed through a side feeder to the mid position of the extruder in order to prevent breakage thereof during the kneading. The melt-kneading temperature of the thermoplastic resin composition is usually 200 to 300° C. and preferably 220 to 280° C.

The printing film of the present invention can be produced by subjecting the thermoplastic resin composition (I) used as a molding material to various molding methods such as calender molding, inflation molding and T-die extrusion molding. Among these molding methods, preferred is the T-die molding method.

The T-die molding method is such a method in which a molten resin is injected through a T-die to form a soft film, and then the soft film is extruded over cast roll to bring the film into close face contact with the cast roll, followed by cooling and solidifying the film. The number of the case rolls is not particularly limited, and may be two or more. The configuration of the cast roll may be, for example, a linear type, a Z type, an L type, etc., although not particularly limited thereto. Also, the method of flowing the molten resin extruded through an opening of the die onto the cast roll is not particularly limited.

The degree of adhesion between the thus extruded sheet-like thermoplastic resin and the case rolls may vary depending upon the temperature of the cast roll. When the cast roll temperature is raised, the adhesion between the thermoplastic resin and the cast roll is enhanced. However, when the cast roll temperature is increased excessively, the sheet-like thermoplastic resin tends to be hardly peeled off from the cast roll, so that there tends to arise such a problem that the resin undesirably remains stuck onto the cast roll.

The thickness of the printing film of the present invention is usually 50 to 2500 μm, preferably 70 to 1400 μm, more preferably 70 to 1000 μm and especially preferably 70 to 500 μm.

The printing film of the present invention may be produced from the thermoplastic resin composition (I) comprising the component (A), the component (B) and the component (C), and the thermoplastic resin composition (II) comprising the component (A) and the component (B) except for the component (C) so as to have a laminated structure in which the thermoplastic resin composition (I) is disposed at least on a side of the film which contacts with the cast roll, namely, has a laminated structure of (I)/(II) or (I)/(II)/(I).

The printing film of the present invention may be provided on a surface thereof with a printed layer (patterned layer) by directly printing the layer thereon. The printed layer may be formed by various printing methods. The ink used for the printing may be either an aqueous ink or a non-aqueous ink such as a solvent-based ink.

As the direct printing method, there may be used known printing methods such as, for example, offset printing, gravure printing, screen printing and ink-jet printing.

Since the printing film of the present invention is excellent in solvent resistance, it is possible to directly form the printed layer on the surface of the film using a solvent-based ink without forming an anchor coat layer thereon.

Alternatively, the printed layer may be formed by the method as described in Japanese Patent Application Laid-Open (KOKAI) No. 2005-178276, namely by transferring patterns previously printed on a PET film, onto the surface of the printing film of the present invention.

In the printing film of the present invention, a transparent resin layer may be further formed on the printed layer by known methods.

The transparent resin layer is usually produced from a molded resin layer of a thermoplastic resin. The thermoplastic resin is not particularly limited as long as it is transparent. Examples of the thermoplastic resin usable for the transparent resin layer include acrylic resins, polycarbonate-based resins, polypropylene-based resins, polyethylene-based resins, polyester-based resins, polystyrene-based resins, ABS resins, polyamide-based resins, ethylene tetrafluoride-based resins, ethylene tetrafluoride/propylene hexafluoride copolymer resins, ethylene tetrafluoride/ethylene copolymer resins, ethylene tetrafluoride/perfluorovinyl ether copolymer resins, ethylene chloride trifluoride resins, and vinylidene fluoride resins. Among these thermoplastic resins, from the viewpoint of a good adhesion to the printed layer, the acrylic resins are preferably used. As the acrylic resins, preferred are those comprising methyl methacrylate as a constitutional monomer component.

The transparent resin layer may be laminated on the printed layer by the method in which the thermoplastic resin previously molded into a film shape or a sheet shape is thermally laminated to cover the printed layer. Alternatively, the thermoplastic resin may be extrusion-laminated on the printed layer so as to coat the printed layer formed on the printing film with the thermoplastic resin.

The thickness of the transparent resin layer is usually 20 to 2000 μm, preferably 50 to 1500 μm and more preferably 50 to 1000 μm. When the thickness of the transparent resin layer is less than 20 μm, the surface of the transparent resin layer tends to be roughed owing to adverse influence of the underlying printed layer. When the thickness of the transparent resin layer is more than 2000 μm, the resulting film tends to suffer from increase in its weight or tends to be economically disadvantageous.

The thus obtained printing film according to the present invention may be suitably used as a material for decorative films which are produced by subjecting the printing film to printing, in various applications such as building materials, OA equipments and domestic appliances, electric and electronic devices, sundry goods, sanitary goods and automobiles.

Figure 2:
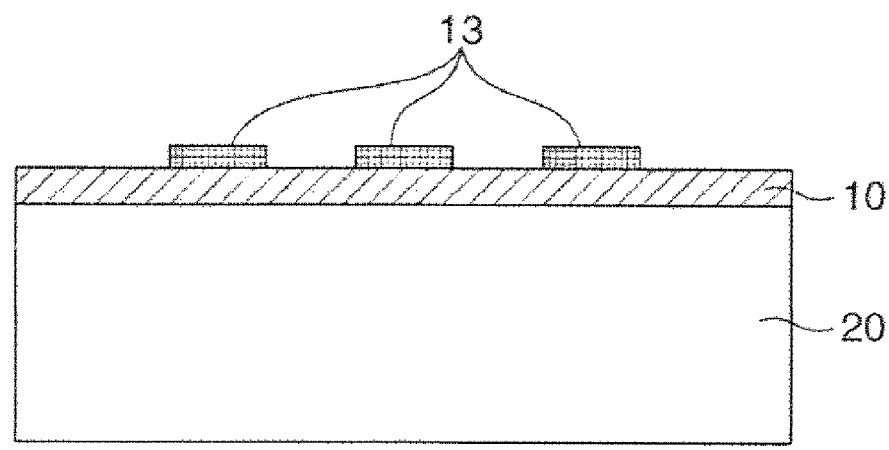
FIG. 2 is a schematic sectional view showing another example of a face material according to the present invention.
Figure 3:
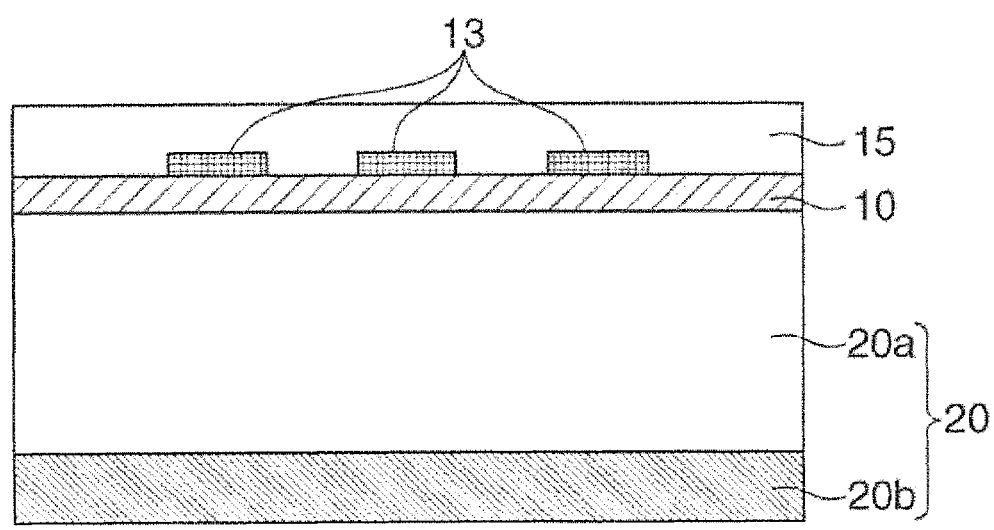
FIG. 3 is a schematic sectional view showing the other example of a face material according to the present invention.

Next, the face material according to the present invention is explained by referring to FIGS. 1 to 3. FIG. 1 shows a laminated structure in which a transparent resin layer 15 is coated as an uppermost layer on a surface of a printing film 10 which surface is opposed to its surface where a base material 20 is provided, and a protective film 30 is provided on the other surface of the base material 20, whereas FIG. 2 shows a laminated structure in which neither the transparent resin layer 15 nor the protective film 30 is provided. In addition, FIG. 3 shows an example of another laminated structure in which the transparent resin layer 15 is coated on the surface of the printing film 10 which surface is opposed to the surface thereof where the base material 20 is provided, and the base material 20 has a two-layer structure.

The face material of the present invention is characterized in that the printing film 10 is laminated on at least one surface of the base material 20, and the patterned layer 13 is laminated on at least a part of the surface of the printing film 10 whose surface is opposed to its surface where the base material 20 is provided.

The base material 20 used in the present invention is not particularly limited as long as the printing film is laminated therewith. Examples of a molding material of the base material 20 include thermoplastic resins, thermosetting resins, organic materials, inorganic materials and metal materials.

Specific examples of the thermoplastic resins include polyvinyl chloride, polyethylene, polypropylene, AS resins, ABS resins, AES resins, ASA resins, polystyrene, high-impact polystyrene, EVA, polyamides, polyethylene terephthalate, polybutylene terephthalate, polycarbonates and polylactic acids. These thermoplastic resins may be used alone or in combination of any two or more thereof.

Specific examples of the thermosetting resins include phenol resins, epoxy resins, urea resins, melamine resins and unsaturated polyester resins. These thermosetting resins may be used alone or in combination of any two or more thereof.

The thermoplastic resin and the thermosetting resin may be each in the form of a recycled resin or a mixture of the recycled resin and a non-recycled resin.

The thermoplastic resin and the thermosetting resin may be compounded with a filler such as glass fibers, carbon fibers, metal fibers, glass beads, wollastonite, milled glass fibers, glass flakes, calcium carbonate, talc, mica, kaolin, graphite, wood chips, organic fibers and pulverized particles of thermosetting resins. These fillers may be compounded alone or in combination of any two or more thereof.

The amount of the filler compounded is usually 3 to 300 parts by mass and preferably 3 to 150 parts by mass based on 100 parts by mass of the thermoplastic resin or the thermosetting resin.

The thermoplastic resin and the thermosetting resin may also be compounded, if required, with various additives other than the filler, such as an antioxidant, an antistatic agent, a lubricant, a colorant, a flame retardant and a flame retarding assistant.

The thermoplastic resin and the thermosetting resin may be in the form of a foamed product obtained by adding a foaming agent thereto. The foaming ratio of the foamed product is usually 1.05 to 20 times and preferably 1.2 to 15 times.

Specific examples of the organic materials include insulation boards, MDF (medium-density fiber boards), hard boards, particle boards, lumber core, LVL (laminated veneer lumber), OSB (oriented strand boards), PSL (parallel strand lumber), WB (wafer boards), hard fiber boards, soft fiber boards, lumber core plywood, board core plywood, special core plywood, veneer core veneer boards, laminated paper sheets or plates impregnated with a tap resin, boards obtained by compressing a mixture of small or linear pieces of crushed (waste) papers and an adhesive under heating, and various woods.

Specific examples of the inorganic materials include calcium silicate boards, flexible boards, homo cement boards, gypsum boards, sheathing gypsum boards, reinforced gypsum boards, gypsum lathing boards, decorative gypsum boards and composite gypsum boards as well as metal materials such as iron, aluminum, copper and various alloys.

The base material 20 formed of a metal may be used in the form of a metal plate in many cases. As the metal plate, there may be employed those generally used as a base material for resin-coated metal plates. Specific examples of the metal plate include hot dip zinc-coated steel plates, electrolytic zinc-coated steel plates, aluminum/zinc composite-coated steel plates, aluminum coated steel plates, stainless steel plates and aluminum-based alloy plates. The thickness, thermal treatment conditions and plating thickness of these metal plates are not particularly limited. In addition, the metal plates may be subjected to surface treatments such as phosphate treatments and chromate treatments.

The base material 20 may have various shapes according to the aimed applications of the face material of the present invention, and may be usually of a plate shape (whose surface may be not flat but deformed with a roundness or irregularities) and further may be a molded product having a thickness larger than that of the plate, etc.

The structure of the printing film as well as the method of printing the patterned layer to be provided thereon may be the same as described previously.

The protective film 30 is laminated on the printing film in order to improve properties such as design property, mechanical strength, scratch resistance and hygienic property.

The material of the protective film 30 is not particularly limited, and may include the molding materials for the base material 20 as described above, as well as rubber polymers, papers, cloths, etc. Among these materials, rubber-reinforced resins such as ABS resins, AES resins and ASA resins are preferred because they are excellent in the above properties.

The face material of the present invention can be obtained by laminating the printing film 10 which is provided thereon with the patterned layer 13 and, if required, the transparent resin layer 15, on one surface of the base material 20. In addition, the protective film 30 may be laminated on the other surface of the base material 20, if required. The construction of the transparent resin layer may be the same as described above. As a molding material of the protective film 30, there may be used the same material as used for the printing film 10. The printing film 10 and the protective film 30 may be formed from either the same material or different materials. FIG. 1 shows the construction in which the transparent resin layer 15 and the protective film 30 are provided, whereas FIG. 2 shows the construction in which neither the transparent resin layer 15 nor the protective film 30 is provided.

Also, the base material 20 may have either a single layer structure or a two or more-layer structure. FIG. 3 shows an example of the construction of the base material which is constituted of two layers including a first base material layer 20*a* and a second base material layer 20*b* in which the printing film 10 is provided on the surface of the first base material layer 20*a* (which is opposed to its surface where the second base material layer 20*b* is provided). When the base material is constituted of two or more layers, the respective layers may be formed from either the same material or different materials.

The surface of the printing film 10 which is laminated with no layer (a lower surface of the second base material layer 20*b* in the example shown in FIG. 3) may be provided with patterns or colored in order to enhance a design property thereof.

When laminating the printing film 10 onto the base material 20, the adhesion therebetween may be conducted by a method using a bonding agent, an adhesive, etc., or by a thermal compression-bonding method.

In addition, in order to enhance the adhesion strength, one or both bonding surfaces of the respective layers may be subjected, if required, to corona discharge treatment, flame treatment, oxidation treatment, plasma treatment, UV treatment, ion bombard treatment, electron beam treatment, solvent treatment, anchor coat-forming treatment or the like.

The face material of the present invention may be used as a component for various products to enhance a design property thereof at low costs as compared to the conventional methods. Further, the face material is excellent in durability without deterioration in patterns even after used for a long period of time.

The face material of the present invention may be used as a component for building products, electric products, vehicle products, furniture products, kitchen products and sundry goods.

Specific examples of the component for various products include floor materials, wall materials, ceiling materials, door materials, furniture components such as drawer parts, various balustrades, table components, desk components, bookcases, window flames, roofing tiles, rain gutters, deck materials, butt end materials, exterior materials, sink cabinets, kitchen systems, bed components, step components, wall panels, architraves, pencils, writing brushes, baseboards, verandahs, corner bead, chair materials, sash components, parabola antenna components, bamboo fences, covers for ducts of air conditioners, bath room components, panel water tank components, signboards, display boards, guide boards, stationeries, interiors and exteriors of vehicles, and parts for OA equipments and domestic appliances.

As the patterns of the patterned layer 13 of the printing film 10 and the protective film 30 (not shown), there may be mentioned colored patterns, marble patterns, wood grain patterns, embossed patterns, picture titles, characters, etc.

EXAMPLES

The present invention is described in more detail below by Examples. However, these Examples are only illustrative and not intended to limit the present invention thereto, and other changes and modifications may be possible unless the subject matters thereof depart from the scope of the present invention. Meanwhile, the terms "part(s)" and "%" used in the following Examples and Comparative Examples represent "part(s) by mass" and "% by mass" unless otherwise specified.

(1) Evaluation Methods:

The methods of measuring various evaluation items used in the following Examples and Comparative Examples are as follows.

(1-1) Mass Melt Flow Rate (MFR):

According to ISO 1133, the mass melt flow rate was measured at 240° C. under a load of 98 N. The unit of the measured value was "g/10 min".

(1-2) Heat Resistance: Elongation Ratio Under Heating

The film before subjected to drawdown-printing was cut to a film strip having a width of 1 inch and a length of 300 mm, and the thus prepared test specimen on which a load of 500 g was suspended was allowed to stand in a constant temperature oven maintained at 130° C. for 10 sec to measure an elongation (L1) thereof relative to a length (L0) of 100 mm of the test specimen as measured before the standing test. The elongation ratio under heating was calculated from the formula: L1/L0×100(%).

(1-3) Mechanical Strength: Tear Strength:

A curable solvent-based ink was drawdown-printed on one surface of the film, and then the thus printed film was allowed to be lying in an air-conditioned room maintained at a temperature of 23° C. and a humidity of 50% RH for 24 hr to coat a printed layer thereon. Thereafter, the resulting film was subjected to measurement of Elemendorf's tensile strength (tear strength) in both of MD direction and TD direction of the film using an Elemendorf's tearing tester (manufactured by Toyo Seiki Co., Ltd.) according to JIS K-7128.

Meanwhile, in the present specification, the "MD direction" means the direction in which the resin is extruded from a T-die, whereas the "TD direction" means the direction perpendicular to the MD direction.

(1-4) Mechanical Strength: Film Impact:

Using a pendulum film impact tester (manufactured by Yasuda Seiki Seisakusho Co., Ltd.), a film impact of the film (before coated) having a size of 100 mm×100 mm was measured. The evaluation for the film impact was carried out under the conditions including a radius of each impact test ball of 6.35 mm and an added weight of 1390 g. In addition, a curable solvent-based ink was drawdown-printed on one surface of the film, and then the thus printed film was allowed to be lying in an air-conditioned room maintained at a temperature of 23° C. and a humidity of 50% RH for 24 hr to coat a printed layer thereon. Thereafter, the resulting film was subjected to measurement of a film impact (after coated) on the coating surface by the same method as described above. The retention rate of the film impact was calculated from the following formula.

Film impact retention rate=(film impact (after coated))/(film impact (before coated))×100(%)

(1-5) Solvent Resistance (Crack Resistance):

The coated film as used above was cut into a test specimen having a size of 100 mm (MD)×100 mm (TD). The thus obtained test specimen was folded along an axis of symmetry in the MD direction, and then folded along an axis of symmetry in the TD direction. According to JIS-Z0237, over each of fold edges of the thus folded test specimen, a manual type pressure roller (2000 g) was reciprocated by two strokes at a speed of 5 mm/sec, and then the folded test specimen was spread into an original state to visually observe the condition of the test specimen. The evaluation was performed five times (n=5). The evaluation ratings are as follows.

◯: The fold edges were free from cracks in all of the five tests (n=5).

Δ: Some of the fold edges suffered from cracks.

X: The fold edges suffered from cracks in all of the five tests (n=5).

(1-6) Printability (Printed Surface Adhesion Property):

A curable solvent-based ink was drawdown-printed on one surface of the film, and then the thus printed film was allowed to be lying in an air-conditioned room maintained at a temperature of 23° C. and a humidity of 50% RH for 24 hr to form a printed layer thereon. Then, an adhesive tape (produced by Nitto K.K.) having a width of 18 mm and a length of about 75 mm was attached onto the surface of the printed layer, and the surface of the adhesive tape was squeezed while applying a finger pressure thereto to bring the tape into close contact with the printed layer. Thereafter, the adhesive tape was rapidly peeled off from the printed layer to visually observe whether the printed layer remained on the film. The results were evaluated according to the following evaluation ratings. Meanwhile, the attachment and peeling-off of the adhesive tape were conducted according to JIS-K-5600-5-6.

◯: Good adhesion between the film and the printed layer without any practical problems X: The printed layer was peeled off.

(1-7) Film-forming Property:

The film-forming property upon forming the film was evaluated according to the following ratings.

◯: The film was stably formed with a uniform and beautiful surface.

Δ: The film sometimes suffered from meandered edges or breakage.

X: Stable formation of the film was not possible, and the obtained film failed to exhibit a uniform and beautiful surface.

(1-8) Film Attachment Follow-up Property (Flexibility):

The film before subjected to drawdown-printing was cut into a size of 300 mm in width (MD)×215 mm in length (TD), and wound around an outer circumferential surface of a cylindrical tube having a diameter of 9 cm and a height of 40 cm. The degree of attachment of the film on the tube was evaluated according to the following ratings. Meanwhile, the film was wound on the tube such that the MD direction of the film was aligned with the circumferential direction of the tube.

◯: Whole part of the film was able to be wound around the tube.

X: Whole part of the film was unable to be wound around the tube.

(1-9) Moisture Absorption Property (Rate of Change in Dimension):

The film before subjected to drawdown-printing was cut into a size of 15 mm in width (MD)×100 mm in length (TD), and allowed to be lying in a thermo-hygrostat (40° C.×90%) for 24 hr to determine a rate of change in dimension of the film in the TD direction according to the following formula.

$$\text{Rate of change in dimension} = \{[TD \text{ length (after being allowed to be lying for 24 hr)}] - [TD \text{ length (before being allowed to be lying)}]\} / [TD \text{ length (before being allowed to be lying)}] \times 100(\%)$$

(1-10) Stickiness to Roll Upon Formation of Film:

A resin sheet on the cast roll upon formation of the film was visually observed to evaluate a stickiness thereof onto the cast roll.

◯: The sheet-like thermoplastic resin was smoothly released from the cast roll and not adhered around the cast roll.

X: The sheet-like thermoplastic resin was not released from the cast roll and adhered around the cast roll.

(1-11) Appearance of Film Formed:

The appearance of the film after formed was visually observed and evaluated.

◯: The surface shape of the cast roll was well transferred to the surface of the obtained film without formation of wrinkles thereon.

X: Wrinkles were present on the surface of the obtained film, and the surface shape of the cast roll was not transferred onto the surface of the film.

(2-1) Component (A) (Rubber-modified Styrene-based Resin):

The polymers obtained by the polymerization method as shown in Table 1 which had the copolymerization ratio and the properties as shown in Table 1, were respectively used.

TABLE 1

| | | | Component (A1) | | Component (A2) | |
|---|---|---|---|---|---|---|
| | | | A1-1 | A1-2 | A2-1 | A2-2 |
| Components compounded (mass %) | Rubber polymer (a) | Polybutadiene rubber (rubber particle size: 280 nm) | 60 | 40 | — | — |
| | Vinyl-based monomer (b1) or (b2) | Styrene | 30 | 42 | 70 | 68 |
| | | Acrylonitrile | 10 | 15 | 30 | 22 |
| | | Methacrylic acid | — | 3 | — | — |
| | | 2-Hydroxyethyl methacrylate | — | — | — | 10 |
| Total amount (mass %) | | | 100 | 100 | 100 | 100 |
| Polymerization method | | | *1 | *1 | *2 | *1 |
| Intrinsic viscosity [η] (dL/g) (30° C., methyl ethyl ketone) | | | 0.24 | 0.48 | 0.70 | 0.66 |
| Graft ratio (mass %) | | | 41 | 45 | — | — |

Note
*1: Emulsion polymerization
*2: Solution polymerization (2-2) Component (B) (Polyamide-based Resin):

B1: Nylon 6; "NOVAMID 1015J" (tradename: produced by Mitsubishi Engineering-Plastics Corporation); relative viscosity: 3.0 (98% sulfuric acid method)

B2: Nylon 6; "NOVAMID 1020J" (tradename: produced by Mitsubishi Engineering-Plastics Corporation); relative viscosity: 3.5 (98% sulfuric acid method)

(2-3) Component (C) (Inorganic Filler: Talc):

C1: "MICRO-ACE K-1" produced by Nippon Talc Co., Ltd., was used. The talc had an average particle size (D50) of 8 μm (as measured by a laser diffraction method) and an apparent density of 0.25 g/mL (as measured according to JIS-K5101).

C2: "MICRO-ACE P-3" produced by Nippon Talc Co., Ltd., was used. The talc had an average particle size (D50) of 5 μm (as measured by a laser diffraction method) and an apparent density of 0.16 g/mL (as measured according to JIS-K5101).

(2-4) Additives:

D1: Calcium stearate; Ca-St (tradename: produced by Nitto Kasei Kogyo Co., Ltd.)

D2: Pentaerythritol tetrakis[3-(3,5-di-t-butyl-4-hydroxyphenyl)propionate]; "IRGANOX 1010" (tradename: produced by Ciba Specialty Chemicals Corp.)

Systems Comprising No Inorganic Filler

Examples 1A to 10A and Comparative Examples 1A to 5A

Systems Comprising No Inorganic Filler

The respective components shown in Tables 2-1 to 2-4 were mixed with each other by a Henschel mixer at the blending ratios as shown Tables 2-1 to 2-4, and the resulting mixture was kneaded by a twin-screw extruder ("TEX44" manufactured by Japan Steel Works, Ltd.; barrel temperature: 250° C.) and then pelletized. The obtained pellets were used for production of a film by the following method.

First, using a film-forming machine including an extruder having a screw diameter of 65 mm equipped with a T-die (die width: 1400 mm; die lip gap: 0.5 mm), the pellets were fed into the extruder, and the molten resin was injected from the T-die at a melting temperature of 270° C. to obtain a soft film. Thereafter, the thus obtained soft film was brought into close face contact with a cast roll using an air knife, and cooled and solidified thereon to obtain a film. The evaluation results of the thus obtained films are shown in Tables 2-1 to 2-4.

Meanwhile, the thickness of each of the films was determined as follows. That is, a film piece cut from the film after the elapse of 1 hr from initiation of production of the film, was subjected to measurement of its thicknesses at a central position in a width direction of the film and positions located from the central position toward both ends thereof at the intervals of 10 mm using a thickness gauge (Model "ID-C1112C" manufactured by Mitsutoyo Corp.) to calculate an average value of the measured thicknesses. The values measured at the positions which lie within the range of 20 mm from each end of the film were excluded from the above calculation of the average value.

TABLE 2-1

| | | Examples | | | | |
|---|---|---|---|---|---|---|
| | | 1A | 2A | 3A | 4A | 5A |
| Component (A1-2) | Carboxylic acid-modified ABS | 10 | 10 | 10 | 10 | 10 |
| Component (A1-1) | ABS | 20 | 20 | 20 | 20 | 20 |
| Component (A2-1) | AS | 30 | 30 | 30 | 10 | 10 |
| Component (A2-2) | OH-modified AS | — | — | — | — | — |
| Component (B1) | Nylon 6 | 40 | 40 | 40 | 60 | 60 |
| Component (B2) | Nylon 6 | — | — | — | — | — |
| Component (D1) | Calcium stearate | 0.2 | 0.2 | 0.2 | 0.2 | 0.2 |
| Component (D2) | Commercial product: IRGANOX 1010 | 0.3 | 0.3 | 0.3 | 0.3 | 0.3 |
| Properties | Functional group in vinyl-based monomer[*1] | COOH | COOH | COOH | COOH | COOH |
| | Amount (%) of functional group in component (A)[*2] | 0.5 | 0.5 | 0.5 | 0.8 | 0.8 |
| | Ratio of rubber to 100 parts by mass of total amount of components (A) and (B) (mass %) | 16.0 | 16.0 | 16.0 | 16.0 | 16.0 |
| | Thickness (μm) | 150 | 102 | 230 | 153 | 95 |
| | MFR (240° C. × 98 N; g/10 min) | 19 | 19 | 17 | 30 | 30 |

TABLE 2-1-continued

|  |  | Examples | | | | |
| --- | --- | --- | --- | --- | --- | --- |
|  |  | 1A | 2A | 3A | 4A | 5A |
| Evaluation results | Roll temperature upon formation of film (° C.) | 95 | 95 | 95 | 95 | 30 |
|  | Elongation ratio (MD) under heating 10 s (%) (130° C.) | 1 | 3.5 | 0 | 0.8 | 6.9 |
| Tear strength (mN) | After coated MD | 1370 | 890 | 4350 | 1600 | 1490 |
|  | After coated TD | 2230 | 1450 | 5040 | 1420 | 1660 |
| Film impact | Before coated (J) | 1.03 | 1.20 | 1.33 | 1.30 | 1.24 |
|  | After coated (J) | 0.66 | 0.12 | 1.30 | 1.24 | 1.16 |
|  | Retention rate (%) | 64 | 10 | 98 | 95 | 93 |
|  | Crack resistance | ○ | ○ | ○ | ○ | ○ |
|  | Printability (Printed surface adhesion property) | ○ | ○ | ○ | ○ | ○ |
|  | Film-forming property | ○ | ○ | ○ | ○ | ○ |
|  | Film attachment follow-up property (flexibility) | ○ | ○ | ○ | ○ | ○ |
|  | Moisture absorption property (rate of change in dimension) | 0.2 | 0.2 | 0.2 | 0.8 | 0.7 |

Note

[1]COOH means a carboxyl group.

[2]Amount of functional group in component (A) (%) = (amount of OH group- or COOH group-containing vinyl-based monomer compounded in component (A))/(total amount of component (A) compounded) × 100

TABLE 2-2

|  |  | Examples | | | | |
| --- | --- | --- | --- | --- | --- | --- |
|  |  | 6A | 7A | 8A | 9A | 10A |
| Component (A1-2) | Carboxylic acid-modified ABS | 10 | 10 | 10 | 10 | — |
| Component (A1-1) | ABS | 20 | 5 | 35 | 20 | 27 |
| Component (A2-1) | AS | 10 | 45 | 15 | — | 9 |
| Component (A2-2) | OH-modified AS | — | — | — | — | 4 |
| Component (B1) | Nylon 6 | — | 40 | 40 | 70 | 60 |
| Component (B2) | Nylon 6 | 60 | — | — | — | — |
| Component (D1) | Calcium stearate | 0.2 | 0.2 | 0.2 | 0.2 | 0.2 |
| Component (D2) | Commercial product: IRGANOX 1010 | 0.3 | 0.3 | 0.3 | 0.3 | 0.3 |
| Properties | Functional group in vinyl-based monomer[1] | COOH | COOH | COOH | COOH | OH |
|  | Amount (%) of functional group in component (A)[2] | 0.8 | 0.5 | 0.5 | 1.0 | 1.0 |
|  | Ratio of rubber to 100 parts by mass of total amount of components (A) and (B) (mass %) | 16.0 | 7.0 | 25.0 | 16.0 | 16.2 |
|  | Thickness (μm) | 152 | 152 | 149 | 150 | 160 |
|  | MFR (240° C. × 98 N; g/10 min) | 12 | 25 | 9 | 40 | 21 |

TABLE 2-2-continued

|  |  | Examples | | | | |
|---|---|---|---|---|---|---|
|  |  | 6A | 7A | 8A | 9A | 10A |
| Evaluation results | Roll temperature upon formation of film (° C.) | 95 | 95 | 95 | 95 | 95 |
|  | Elongation ratio (MD) under heating 10 s (%) (130° C.) | 1.0 | 1.5 | 1.96 | 0.5 | 1.2 |
|  | Tear strength (mN) After coated MD | 3170 | 200 | 2830 | 2980 | 2780 |
|  | After coated TD | 3740 | 1070 | 2780 | 2880 | 2900 |
|  | Film impact Before coated (J) | 1.29 | 0.56 | 1.35 | 1.35 | 1.27 |
|  | After coated (J) | 1.19 | 0.30 | 1.20 | 1.34 | 1.25 |
|  | Retention rate (%) | 92 | 45 | 89 | 99 | 98 |
|  | Crack resistance | ◯ | ◯ | ◯ | ◯ | ◯ |
|  | Printability (Printed surface adhesion property) | ◯ | ◯ | ◯ | ◯ | ◯ |
|  | Film-forming property | ◯ | ◯ | Δ | ◯ | ◯ |
|  | Film attachment follow-up property (flexibility) | ◯ | ◯ | ◯ | ◯ | ◯ |
|  | Moisture absorption property (rate of change in dimension) | 0.8 | 0.3 | 0.2 | 0.8 | 0.6 |

Note

[*1] COOH means a carboxyl group, and OH means a hydroxyl group.

[*2] Amount of functional group in component (A) (%) = (amount of OH group- or COOH group-containing vinyl-based monomer compounded in component (A))/(total amount of component (A) compounded) × 100

TABLE 2-3

|  |  | Comparative Examples | | | | |
|---|---|---|---|---|---|---|
|  |  | 1A | 2A | 3A | 4A | 5A |
| Component (A1-2) | Carboxylic acid-modified ABS | 5 | 10 | — | 30 | 10 |
| Component (A1-1) | ABS | 15 | 20 | 27 | 7 | 45 |
| Component (A2-1) | AS | — | 50 | 13 | 23 | 5 |
| Component (A2-2) | OH-modified AS | — | — | — | — | — |
| Component (B1) | Nylon 6 | 80 | 20 | 60 | 40 | 40 |
| Component (B2) | Nylon 6 | — | — | — | — | — |
| Component (D1) | Calcium stearate | 0.2 | 0.2 | 0.2 | 0.2 | 0.2 |
| Component (D2) | Commercial product: IRGANOX 1010 | 0.3 | 0.3 | 0.3 | 0.3 | 0.3 |
| Properties | Functional group in vinyl-based monomer[*1] | COOH | COOH | — | COOH | COOH |
|  | Amount (%) of functional group in component (A)[*2] | 0.8 | 0.4 | — | 1.5 | 0.5 |
|  | Ratio of rubber to 100 parts by mass of total amount of components (A) and (B) (mass %) | 10 | 16.0 | 16.2 | 16.0 | 31.0 |
|  | Thickness (μm) | 100 | 156 | 151 | 151 | 153 |
|  | MFR (240° C. × 98 N; g/10 min) | 65 | 10 | 20 | 4 | 6 |

TABLE 2-3-continued

|  |  |  | Comparative Examples | | | | |
|---|---|---|---|---|---|---|---|
|  |  |  | 1A | 2A | 3A | 4A | 5A |
| Evaluation results | Roll temperature upon formation of film (° C.) | | 95 | 95 | 95 | 95 | 95 |
|  | Elongation ratio (MD) under heating 10 s (%) (130° C.) | | 0.4 | 2.2 | 0.3 | 1.1 | 2.3 |
|  | Tear strength (mN) | After coated MD | 1790 | 460 | 330 | 2130 | 2910 |
|  |  | TD | 1880 | 1370 | 3200 | 2450 | 2820 |
|  | Film impact | Before coated (J) | 1.40 | 0.59 | 0.63 | 1.37 | 1.32 |
|  |  | After coated (J) | 1.35 | 0.10 | 0.31 | 1.19 | 1.19 |
|  |  | Retention rate (%) | 93 | 17 | 49 | 87 | 90 |
|  | Crack resistance | | ○ | X | ○ | ○ | ○ |
|  | Printability (Printed surface adhesion property) | | ○ | ○ | ○ | ○ | ○ |
|  | Film-forming property | | ○ | ○ | ○ | X | X |
|  | Film attachment follow-up property (flexibility) | | ○ | ○ | ○ | ○ | ○ |
|  | Moisture absorption property (rate of change in dimension) | | 1.2 | 0.1 | 0.7 | 0.3 | 0.3 |

Note
*[1]COOH means a carboxyl group, and OH means a hydroxyl group.
*[2]Amount of functional group in component (A) (%) = (amount of OH group- or COOH group-containing vinyl-based monomer compounded in component (A))/(total amount of component (A) compounded) × 100

From Tables 2-1 to 2-3, the followings were apparently recognized.

The printing films obtained by molding the thermoplastic resin compositions (I) of Examples 1A to 10A had the properties aimed by the present invention.

On the other hand, the printing film obtained by molding the resin composition of Comparative Example 1A was deteriorated in moisture absorption resistance because the amount of the component (B) compounded in the composition was too large out of the range defined by the present invention.

The printing film obtained by molding the resin composition of Comparative Example 2A was deteriorated in solvent resistance (crack resistance, etc.) because the amount of the component (B) compounded in the composition was too small out of the range defined by the present invention.

The printing film obtained by molding the resin composition of Comparative Example 3A as an example using no functional group-containing compound as the vinyl-based monomer, had a large difference between tear strength values in the TD and MD directions, and was therefore non-uniform in mechanical strength.

The printing film obtained by molding the resin composition of Comparative Example 4A as an example using an excessively large amount of the functional group-containing compound as the vinyl-based monomer, was deteriorated in film-forming property.

The printing film obtained by molding the resin composition of Comparative Example 5A was deteriorated in film-forming property because the amount of the rubber compounded in the composition was too large out of the range defined by the present invention.

Example 11A

A transparent resin film was thermo-compression-bonded and laminated onto the printed surface of the film obtained in Example 1A by applying a pressing force of 20 kg/cm² thereto at a temperature of 150° C. for 15 min to prepare a decorative film. Meanwhile, a 50 µm-thick acrylic resin film formed of a copolymer comprising methyl methacrylate, butyl acrylate and styrene at a mass ratio of 81/16/3 (total amount of the three components was 100 parts by mass) was used as the transparent film. As a result, it was confirmed that the film-forming property was good without any problems, and the resulting decorative film exhibited a beautiful appearance.

Example 12A

The same procedure as defined in Example 11A was conducted except for using the film obtained in Example 5A, thereby preparing a decorative film. As a result, it was confirmed that the film-forming property was good without any problems, and the resulting decorative film exhibited a beautiful appearance.

Systems Comprising Inorganic Filler

Examples 1B to 12B and Reference Examples 1 to 6

The respective components shown in Tables 3-1 to 3-3 were mixed with each other by a Henschel mixer at the blending ratios as shown Tables 3-1 to 3-3, and the resulting mixture was kneaded by a twin-screw extruder ("TEX44" manufactured by Japan Steel Works, Ltd.; barrel temperature: 250° C.) and then pelletized. The obtained pellets were used for production of a film by the following method.

First, using a film-forming machine including an extruder having a screw diameter of 65 mm equipped with a T-die (die width: 1400 mm; die lip gap: 0.5 mm), the pellets were fed into the extruder, and the molten resin was injected from the T-die at a melting temperature of 270° C. to obtain a soft film. Thereafter, the thus obtained soft film was brought into close face contact with a cast roll whose surface was maintained at a predetermined temperature using an air knife, and cooled and solidified thereon to obtain a film. The evaluation results of the thus obtained films are shown in Tables 3-1 to 3-3.

Meanwhile, the thickness of each of the films was determined by the same method as used in Example 1A above.

TABLE 3-1

|  |  | Examples ||||||
|  |  | 1B | 2B | 3B | 4B | 5B | 6B |
|---|---|---|---|---|---|---|---|
| Component (A1-2) | Carboxylic acid-modified ABS | 10 | 10 | 10 | 10 | 10 | 10 |
| Component (A1-1) | ABS | 20 | 20 | 20 | 20 | 20 | 20 |
| Component (A2-1) | AS | 10 | 10 | 10 | 10 | 10 | 10 |
| Component (A2-2) | OH-modified AS | — | — | — | — | — | — |
| Component (B1) | Nylon 6 | 60 | 60 | 20 | 60 | 60 | 60 |
| Component (B2) | Nylon 6 | — | — | 40 | — | — | — |
| Component (C1) | Talc: average particle size $D_{50}$: 8 µm | 10 | — | — | 10 | — | — |
| Component (C2) | Talc: average particle size $D_{50}$: 5 µm | — | 10 | 10 | — | 10 | 10 |
| Component (D1) | Calcium stearate | 0.2 | 0.2 | 0.2 | 0.2 | 0.2 | 0.2 |
| Component (D2) | Commercial product: IRGANOX 1010 | 0.3 | 0.3 | 0.3 | 0.3 | 0.3 | 0.3 |
| Properties | Functional group in vinyl-based monomer*[1] | COOH | COOH | COOH | COOH | COOH | COOH |
|  | Amount (%) of functional group in component (A)*[2] | 0.8 | 0.8 | 0.8 | 0.8 | 0.8 | 0.8 |
|  | Ratio of rubber to 100 parts by mass of total amount of components (A) and (B) (mass %) | 16.0 | 16.0 | 16.0 | 16.0 | 16.0 | 16.0 |
|  | Thickness (µm) | 100 | 100 | 100 | 100 | 100 | 100 |
|  | MFR (240° C. × 98 N; g/10 min) | 25 | 23 | 11 | 25 | 23 | 23 |
| Evaluation results | Roll temperature upon formation of film (° C.) | 90 | 90 | 90 | 30 | 30 | 50 |
|  | Elongation ratio (MD) under heating 10 s (%) (130° C.) | 1.6 | 1.3 | 1.3 | 4.9 | 4.5 | 3.9 |
| Film impact | Before coated (J) | 1.01 | 1.09 | 1.11 | 2.77 | 2.65 | 1.55 |
|  | After coated (J) | 0.96 | 1.02 | 0.91 | 0.85 | 1.4 | 1.03 |
|  | Retention rate (%) | 95 | 79 | 82 | 31 | 53 | 66 |
|  | Crack resistance | ○ | ○ | ○ | ○ | ○ | ○ |
|  | Printability (Printed surface adhesion property) | ○ | ○ | ○ | ○ | ○ | ○ |
|  | Film-forming property | ○ | ○ | ○ | ○ | ○ | ○ |
|  | Film attachment follow-up property (flexibility) | ○ | ○ | ○ | ○ | ○ | ○ |
|  | Moisture absorption property (rate of change in dimension) | 0.8 | 0.7 | 0.7 | 0.7 | 0.8 | 0.8 |
|  | Stickiness to roll upon formation of film | ○ | ○ | ○ | ○ | ○ | ○ |

TABLE 3-1-continued

|  |  | Examples |  |  |  |  |  |
|---|---|---|---|---|---|---|---|
|  |  | 1B | 2B | 3B | 4B | 5B | 6B |
|  | Appearance of film formed | ○ | ○ | ○ | ○ | ○ | ○ |

Note
*[1] COOH means a carboxyl group.
*[2] Amount of functional group in component (A) (%) = (amount of OH group- or COOH group-containing vinyl-based monomer compounded in component (A))/(total amount of component (A) compounded) × 100

TABLE 3-2

|  |  | Examples |  |  |  |  |  |
|---|---|---|---|---|---|---|---|
|  |  | 7B | 8B | 9B | 10B | 11B | 12B |
| Component (A1-2) | Carboxylic acid-modified ABS | 10 | 10 | 10 | — | 10 | 10 |
| Component (A1-1) | ABS | 20 | 20 | 20 | 30 | 10 | 40 |
| Component (A2-1) | AS | 10 | 30 | — | 6 | 20 | — |
| Component (A2-2) | OH-modified AS | — | — | — | 4 | — | — |
| Component (B1) | Nylon 6 | 60 | 40 | 70 | 60 | 60 | 50 |
| Component (B2) | Nylon 6 | — | — | — | — | — | — |
| Component (C1) | Talc: average particle size $D_{50}$: 8 μm | — | — | — | — | — | — |
| Component (C2) | Talc: average particle size $D_{50}$: 5 μm | 10 | 10 | 10 | 10 | 10 | 10 |
| Component (D1) | Calcium stearate | 0.2 | 0.2 | 0.2 | 0.2 | 0.2 | 0.2 |
| Component (D2) | Commercial product: IRGANOX 1010 | 0.3 | 0.3 | 0.3 | 0.3 | 0.3 | 0.3 |
| Properties | Functional group in vinyl-based monomer*[1] | COOH | COOH | COOH | OH | COOH | COOH |
|  | Amount (%) of functional group in component (A)*[2] | 0.8 | 0.5 | 1.0 | 1.0 | 0.8 | 0.6 |
|  | Ratio of rubber to 100 parts by mass of total amount of components (A) and (B) (mass %) | 16.0 | 16.0 | 16.0 | 18.0 | 10.0 | 28.0 |
|  | Thickness (μm) | 100 | 100 | 100 | 100 | 100 | 100 |
|  | MFR (240° C. × 98 N; g/10 min) | 23 | 14 | 31 | 13 | 28 | 15 |
| Evaluation results | Roll temperature upon formation of film (° C.) | 70 | 90 | 90 | 90 | 90 | 90 |
|  | Elongation ratio (MD) under heating 10 s (%) (130° C.) | 2.9 | 3.8 | 1.2 | 1.5 | 3.6 | 1.9 |
|  | Film impact — Before coated (J) | 1.33 | 1.04 | 1.16 | 1.02 | 0.46 | 1.24 |
|  | After coated (J) | 1.1 | 0.51 | 1.09 | 0.92 | 0.39 | 1.02 |
|  | Retention rate (%) | 83 | 49 | 95 | 90 | 85 | 82 |
|  | Crack resistance | ○ | ○ | ○ | ○ | Δ | ○ |
|  | Printability (Printed surface adhesion property) | ○ | ○ | ○ | ○ | ○ | ○ |
|  | Film-forming property | ○ | ○ | ○ | ○ | ○ | ○ |
|  | Film attachment follow-up property (flexibility) | ○ | ○ | ○ | ○ | ○ | ○ |

TABLE 3-2-continued

|  |  | Examples |  |  |  |  |  |
|---|---|---|---|---|---|---|---|
|  |  | 7B | 8B | 9B | 10B | 11B | 12B |
|  | Moisture absorption property (rate of change in dimension) | 0.8 | 0.5 | 1.2 | 0.7 | 0.7 | 0.8 |
|  | Stickiness to roll upon formation of film | ○ | ○ | ○ | ○ | ○ | ○ |
|  | Appearance of film formed | ○ | ○ | ○ | ○*3 | ○ | ○ |

Note
*[1]COOH means a carboxyl group, and OH means a hydroxyl group.
*[2]Amount of functional group in component (A) (%) = (amount of OH group- or COOH group-containing vinyl-based monomer compounded in component (A))/(total amount of component (A) compounded) × 100
*[3]It means that the film was well tinted.

TABLE 3-3

|  |  | Reference Examples |  |  |  |  |  |
|---|---|---|---|---|---|---|---|
|  |  | 1B | 2B | 3B | 4B | 5B | 6B |
| Component (A1-2) | Carboxylic acid-modified ABS | 10 | 10 | 10 | 10 | 10 | 10 |
| Component (A1-1) | ABS | 20 | 20 | 20 | 20 | 20 | 20 |
| Component (A2-1) | AS | 10 | 10 | 10 | 10 | 10 | 10 |
| Component (A2-2) | OH-modified AS | — | — | — | — | — | — |
| Component (B1) | Nylon 6 | 60 | 60 | 60 | 60 | 60 | 60 |
| Component (B2) | Nylon 6 | — | — | — | — | — | — |
| Component (C1) | Talc: average particle size $D_{50}$: 8 μm | 5 | 20 | — | — | — | — |
| Component (C2) | Talc: average particle size $D_{50}$: 5 μm | — | — | 5 | 20 | — | — |
| Component (D1) | Calcium stearate | 0.2 | 0.2 | 0.2 | 0.2 | 0.2 | 0.2 |
| Component (D2) | Commercial product: IRGANOX 1010 | 0.3 | 0.3 | 0.3 | 0.3 | 0.3 | 0.3 |
| Properties | Functional group in vinyl-based monomer*[1] | COOH | COOH | COOH | COOH | COOH | COOH |
|  | Amount (%) of functional group in component (A)*[2] | 0.8 | 0.8 | 0.8 | 0.8 | 0.8 | 0.8 |
|  | Ratio of rubber to 100 parts by mass of total amount of components (A) and (B) (mass %) | 16 | 16 | 16 | 16 | 16 | 16 |
|  | Thickness (μm) | 100 | 100 | 100 | 100 | 100 | 100 |
|  | MFR (240° C. × 98 N; g/10 min) | 29 | 18 | 27 | 15 | 30 | 30 |
| Evaluation results | Roll temperature upon formation of film (° C.) | 90 | 90 | 90 | 90 | 90 | 30 |
|  | Elongation ratio (MD) under heating 10 s (%) (130° C.) | 1.6 | 1.1 | 1.2 | 1.1 | 2.2 | 8.8 |
| Film impact | Before coated (J) | 1.31 | 0.52 | 1.64 | 0.77 | 2.2 | 1.4 |
|  | After coated (J) | 1.08 | 0.51 | 1.77 | 0.44 | 1.3 | 1.2 |
|  | Retention rate (%) | 82 | 98 | 108 | 57 | 59 | 86 |

TABLE 3-3-continued

|  | Reference Examples | | | | | |
| --- | --- | --- | --- | --- | --- | --- |
|  | 1B | 2B | 3B | 4B | 5B | 6B |
| Crack resistance | ○ | X | ○ | X | ○ | ○ |
| Printability (Printed surface adhesion property) | ○ | ○ | ○ | ○ | ○ | ○ |
| Film-forming property | ○ | ○ | ○ | ○ | ○ | ○ |
| Film attachment follow-up property (flexibility) | ○ | ○ | ○ | ○ | ○ | ○ |
| Moisture absorption property (rate of change in dimension) | 0.7 | 0.8 | 0.8 | 0.7 | 0.7 | 0.7 |
| Stickiness to roll upon formation of film | X | ○ | X | ○ | X | ○ |
| Appearance of film formed | X | ○ | X | ○ | X | ○ |

Note
*[1] COOH means a carboxyl group.
*[2] Amount of functional group in component (A) (%) = (amount of OH group- or COOH group-containing vinyl-based monomer compounded in component (A))/(total amount of component (A) compounded) × 100

From Tables 3-1 to 3-3, the followings were apparently recognized.

The printing films obtained in Examples 1B to 12B by molding the thermoplastic resin compositions (I) compounded with the components (A), (B) and (C) according to the present invention were hardly stuck to the roll upon formation thereof, and excellent in appearance as well as film-forming property, heat resistance, solvent resistance, printability and moisture absorption resistance.

In Reference Examples 1 and 3 in which the amount of talc (component (C)) compounded in the resin compositions was too small out of the range defined by the present invention, the films were likely to stick onto the roll upon formation thereof, and also deteriorated in appearance after formed. In Reference Examples 2 and 4 in which the amount of talc compounded in the resin compositions was too large out of the range defined by the present invention, the films were deteriorated in solvent resistance (crack resistance). In Reference Example 5 in which no talc was compounded in the resin composition, the film was likely to stick onto the roll and also deteriorated in appearance after formed. In Reference Example 6 in which no talc was compounded in the resin composition and the roll temperature was as low as 30° C., the film was deteriorated in heat resistance.

Example 14B

A transparent resin film was thermo-compression-bonded and laminated onto the printed surface of the film obtained in Example 1B by applying a pressing force of 20 kg/cm² thereto at a temperature of 150° C. for 15 min to prepare a decorative film. Meanwhile, a 50 µm-thick acrylic resin film formed of a copolymer comprising methyl methacrylate, butyl acrylate and styrene at a mass ratio of 81/16/3 (total amount of the three components was 100 parts by mass) was used as the transparent film. As a result, it was confirmed that the film-forming property was good without any problems, and the resulting decorative film exhibited a beautiful appearance.

Example 15B

The same procedure as defined in Example 14B was conducted except for using the film obtained in Example 5B, thereby preparing a decorative film. As a result, it was confirmed that the film-forming property was good without any problems, and the resulting decorative film exhibited a beautiful appearance.

Face Material

Examples 1C to 4C

The respective printing films obtained in Examples 3A, 6A, 8A and 10A were cut into an A4-size printing film (having a length of 297 mm and a width of 210 mm). A curable solvent-based ink was printed on one surface of the thus obtained A4-size printing film, and then the resulting film was allowed to be lying in a thermo-hygrostat at a temperature of 23° C. and a humidity of 50% RH for 24 hr to laminate a printed layer thereon. The thus obtained film laminated with the printed layer was used to produce a face material shown in FIG. 1(c) in the following manner.

First, a base material (20) was produced.

A first base material layer (20a) was formed by using MDF (thickness: 15 mm; length: 297 mm; width: 210 mm), whereas a second base material layer (20b) was formed by using a commercially available product "VALUETEC NSG100" (thickness: 0.5 mm; length: 297 mm; width: 210 mm) produced by Techno Polymer Co., Ltd. The color tone of the product "VALUETEC NSG100" was a white color tinted with titanium oxide.

The adhesion between MDF and "VALUETEC NSG100" was conducted using an adhesive composition ("BA-20"/ "BA-11B" (both are tradenames)=100/2.5 (parts)) produced by Chuo Rika Kogyo Co., Ltd., in a coating amount of 80 g/m² (dried) at room temperature (25 to 30° C.) under a pressing condition of 0.5 N/cm²×2 days.

Next, the film (10) laminated with the printed layer (13) was bonded onto the surface of MDF. The bonding conditions were the same as described above.

Next, a transparent resin film was thermo-compression-bonded onto the surface of the printed layer (13) to form a transparent resin layer (15) thereon, thereby obtaining a face material shown in FIG. 1(c) (as a door for kitchen systems). A 50 μm-thick acrylic resin film formed of a copolymer comprising methyl methacrylate, butyl acrylate and styrene at a mass ratio of 81/16/3 (total amount of the three components was 100 parts by mass) was used as the transparent resin film. The thermo-compression-bonding was conducted by applying a pressing force of 20 kg/cm2 to the transparent resin film at 150° C. for 15 min. The transparent resin film was well thermo-compression-bonded without any significant problems, and the resulting face material had a beautiful appearance.

The invention claimed is:

1. A flexible printing film having a thickness of 50 to 500 μm and produced by molding a thermoplastic resin composition (I) comprising 100 parts by mass in total of a mixed resin comprising 25 to 75% by mass of a rubber-modified styrene-based resin (A) and 25 to 75% by mass of a polyamide-based resin (B),
   the component (A) comprising a graft copolymer (A1) obtained by polymerizing a vinyl-based monomer (b1) in the presence of a rubber polymer (a), or a mixture of the graft copolymer (A1) and a (co)polymer (A2) of a vinyl-based monomer (b2);
   the vinyl-based monomer (b1) and the vinyl-based monomer (b2) each comprising an aromatic vinyl compound and a cyanided vinyl compound as essential monomer components;
   at least one of the vinyl-based monomer (b1) and the vinyl-based monomer (b2) further comprising at least one functional group-containing vinyl-based monomer selected from the group consisting of a hydroxyl group-containing unsaturated compound, an epoxy group-containing unsaturated compound, a substituted or unsubstituted amino group-containing unsaturated compound, a carboxyl group-containing unsaturated compound, an acid anhydride group-containing unsaturated compound and an oxazoline group-containing unsaturated compound;
   a content of the functional group-containing vinyl-based monomer in the component (A) being 0.1 to 1.2% by mass based on 100% by mass of a whole amount of the component (A);
   the component (A) comprising an acetone-soluble component having an intrinsic viscosity of 0.15 to 1.5 dL/g as measured in methyl ethyl ketone at 30° C.; and
   the thermoplastic resin composition (I) comprising the rubber polymer (a) in an amount of 5 to 30 parts by mass based on 100 parts by mass of a total amount of the components (A) and (B),
   wherein the flexible film having an elongation ratio (MD) under heating 10 s (130° C.) of not more than 3.8 measured by a method that the film, before being subjected to drawdown-printing, was cut into a specimen having a width of 1 inch and a length of 300 mm, the thus prepared test specimen on which a load of 500 g is suspended is allowed to stand in a constant temperature oven maintained at 130° C. for 10 sec to measure an elongation (L1) thereof relative to a length (L0) of 100 mm, the test specimen as measured before the standing test, and the elongation ratio under heating is calculated from the formula: L1/L0×100 (%).

2. A flexible printing film according to claim 1, wherein the thermoplastic resin composition (I) further comprises an inorganic filler (C) in an amount of 7 to 18 parts by mass based on 100 parts by mass of a total amount of the components (A) and (B).

3. A flexible printing film according to claim 2, wherein the inorganic filler (C) is talc.

4. A flexible printing film according to claim 1, wherein the thermoplastic resin composition (I) comprises the rubber polymer (a) in an amount of 10 to 22 parts by mass based on 100 parts by mass of a total amount of the components (A) and (B).

5. A flexible printing film according to claim 1, wherein the rubber polymer (a) is a conjugated diene-based rubber.

6. A flexible printing film according to claim 1, wherein the component (A1) comprises the following component (A1-1) and/or the following component (A1-2):
   Component (A1-1): A graft copolymer obtained by polymerizing a vinyl-based monomer (b1-1) comprising an aromatic vinyl compound and a cyanided vinyl compound in the presence of the rubber polymer (a); and
   Component (A1-2): A graft copolymer obtained by polymerizing a vinyl-based monomer (b 1-2) comprising an aromatic vinyl compound, a cyanided vinyl compound and at least one functional group-containing vinyl-based monomer selected from the group consisting of a hydroxyl group-containing unsaturated compound, an epoxy group-containing unsaturated compound, a substituted or unsubstituted amino group-containing unsaturated compound, a carboxyl group-containing unsaturated compound, an acid anhydride group-containing unsaturated compound and an oxazoline group-containing unsaturated compound in the presence of the rubber polymer (a).

7. A flexible printing film according to claim 1, wherein the component (A2) comprises the following component (A2-1) and/or the following component (A2-2):
   Component (A2-1): A (co)polymer obtained by polymerizing a vinyl-based monomer (b2-1) comprising an aromatic vinyl compound and a cyanided vinyl compound in the absence of the rubber polymer (a); and
   Component (A2-2): A (co)polymer obtained by polymerizing a vinyl-based monomer (b2-2) comprising an aromatic vinyl compound, a cyanided vinyl compound and at least one functional group-containing vinyl-based monomer selected from the group consisting of a hydroxyl group-containing unsaturated compound, an epoxy group-containing unsaturated compound, a substituted or unsubstituted amino group-containing unsaturated compound, a carboxyl group-containing unsaturated compound, an acid anhydride group-containing unsaturated compound and an oxazoline group-containing unsaturated compound in the absence of the rubber polymer (a).

8. A flexible decorative film comprising the printing film as defined in claim 1 and a printed layer laminated on at least one surface of the printing film.

9. A flexible decorative film according to claim 8, further comprising a transparent resin layer laminated on the printed layer.

10. A process for producing a printing film having a thickness of 50 to 500 μm, which process comprises subjecting a thermoplastic resin composition (I) to T-die molding at a temperature of a cast roll of 70 to 95° C.,
   wherein the thermoplastic resin composition (I) comprises 100 parts by mass in total of a mixed resin comprising 25 to 75% by mass of a rubber-modified styrene-based resin (A) and 25 to 75% by mass of a polyamide-based resin (B),
   the component (A) comprises a graft copolymer (A1) obtained by polymerizing a vinyl-based monomer (b1) in the presence of a rubber polymer (a), or a mixture of the graft copolymer (A1) and a (co)polymer (A2) of a vinyl-based monomer (b2);

the vinyl-based monomer (b1) and the vinyl-based monomer (b2) each comprises an aromatic vinyl compound and a cyanided vinyl compound as essential monomer components;

at least one of the vinyl-based monomer (b1) and the vinyl-based monomer (b2) further comprises at least one functional group-containing vinyl-based monomer selected from the group consisting of a hydroxyl group-containing unsaturated compound, an epoxy group-containing unsaturated compound, a substituted or unsubstituted amino group-containing unsaturated compound, a carboxyl group-containing unsaturated compound, an acid anhydride group-containing unsaturated compound and an oxazoline group-containing unsaturated compound;

a content of the functional group-containing vinyl-based monomer in the component (A) is 0.1 to 1.2% by mass based on 100% by mass of a whole amount of the component (A);

the component (A) comprises an acetone-soluble component having an intrinsic viscosity of 0.15 to 1.5 dL/g as measured in methyl ethyl ketone at 30° C.; and the thermoplastic resin composition (I) comprises the rubber polymer (a) in an amount of 5 to 30 parts by mass based on 100 parts by mass of a total amount of the components (A) and (B).

11. A process according to claim 10, wherein the temperature of a cast roll is 90 to 95° C.

12. A process according to claim 10, wherein the thermoplastic resin composition (I) further comprises an inorganic filler (C) in an amount of 7 to 18 parts by mass based on 100 parts by mass of a total amount of the components (A) and (B).

13. A process according to claim 12, wherein the inorganic filler (C) is talc.

14. A process according to claim 10, wherein the thermoplastic resin composition (I) comprises the rubber polymer (a) in an amount of 10 to 22 parts by mass based on 100 parts by mass of a total amount of the components (A) and (B).

15. A process according to claim 10, wherein the rubber polymer (a) is a conjugated diene-based rubber.

16. A process according to claim 10, wherein the component (A1) comprises the following component (A1-1) and/or the following component (A1-2):

Component (A1-1): A graft copolymer obtained by polymerizing a vinyl-based monomer (b1-1) comprising an aromatic vinyl compound and a cyanided vinyl compound in the presence of the rubber polymer (a); and Component (A1-2): A graft copolymer obtained by polymerizing a vinyl-based monomer (b1-2) comprising an aromatic vinyl compound, a cyanided vinyl compound and at least one functional group-containing vinyl-based monomer selected from the group consisting of a hydroxyl group-containing unsaturated compound, an epoxy group-containing unsaturated compound, a substituted or unsubstituted amino group-containing unsaturated compound, a carboxyl group-containing unsaturated compound, an acid anhydride group-containing unsaturated compound and an oxazoline group-containing unsaturated compound in the presence of the rubber polymer (a).

17. A process according to claim 10, wherein the component (A2) comprises the following component (A2-1) and/or the following component (A2-2):

Component (A2-1): A (co)polymer obtained by polymerizing a vinyl-based monomer (b2-1) comprising an aromatic vinyl compound and a cyanided vinyl compound in the absence of the rubber polymer (a); and Component (A2-2): A (co)polymer obtained by polymerizing a vinyl-based monomer (b2-2) comprising an aromatic vinyl compound, a cyanided vinyl compound and at least one functional group-containing vinyl-based monomer selected from the group consisting of a hydroxyl group-containing unsaturated compound, an epoxy group-containing unsaturated compound, a substituted or unsubstituted amino group-containing unsaturated compound, a carboxyl group-containing unsaturated compound, an acid anhydride group-containing unsaturated compound and an oxazoline group-containing unsaturated compound in the absence of the rubber polymer (a).

18. A process comprising the printing film as defined in claim 10 and a printed layer laminated on at least one surface of the printing film.

19. A process according to claim 18, further comprising a transparent resin layer laminated on the printed layer.

* * * * *